(12) United States Patent
An et al.

(10) Patent No.: US 11,355,989 B2
(45) Date of Patent: Jun. 7, 2022

(54) BUS BAR AND MOTOR COMPRISING SAME

(71) Applicant: LG INNOTEK CO., LTD., Seoul (KR)

(72) Inventors: Il Hwan An, Seoul (KR); Beom Seok Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 157 days.

(21) Appl. No.: 16/760,161

(22) PCT Filed: Aug. 20, 2018

(86) PCT No.: PCT/KR2018/009499
§ 371 (c)(1),
(2) Date: Apr. 29, 2020

(87) PCT Pub. No.: WO2018/088424
PCT Pub. Date: May 9, 2019

(65) Prior Publication Data
US 2020/0343781 A1    Oct. 29, 2020

(30) Foreign Application Priority Data

Oct. 31, 2017 (KR) .................. 10-2017-0143445
Oct. 31, 2017 (KR) .................. 10-2017-0143446

(51) Int. Cl.
*H02K 3/52* (2006.01)
*H02K 5/173* (2006.01)

(52) U.S. Cl.
CPC .......... *H02K 3/522* (2013.01); *H02K 5/1732* (2013.01); *H02K 2203/09* (2013.01)

(58) Field of Classification Search
CPC ... H02K 2203/09; H02K 3/522; H02K 5/1732
See application file for complete search history.

(56) References Cited

U.S. PATENT DOCUMENTS

| 9,997,972 B2* | 6/2018 | Houzumi | H02K 15/0062 |
| 10,361,603 B2* | 7/2019 | Aizawa | H02K 9/19 |
| 10,547,228 B2 | 1/2020 | Kong | |

(Continued)

FOREIGN PATENT DOCUMENTS

| JP | 2006-174656 A | 6/2006 |
| JP | 2009-290921 A | 12/2009 |

(Continued)

*Primary Examiner* — Robert W Horn
(74) *Attorney, Agent, or Firm* — Birch, Stewart, Kolasch & Birch, LLP

(57) ABSTRACT

An embodiment relates to a bus bar comprising a main body; an upper terminal which is disposed on an upper surface of the main body; and a lower terminal which is disposed on a lower surface of the main body, wherein the upper terminal includes a first upper terminal and a second upper terminal, the lower terminal includes a first lower terminal, the main body includes a first hole and a second hole which penetrate the main body, and the first lower terminal has one end which is connected to the first upper terminal through the first hole and the other end which is connected to the second upper terminal through the second hole and to a motor comprising the same. According to this, space utilization inside the motor can be improved.

16 Claims, 26 Drawing Sheets

(56) References Cited

U.S. PATENT DOCUMENTS

| | | | |
|---|---|---|---|
| 2013/0264140 A1* | 10/2013 | Nakayama | H02K 3/345 |
| | | | 180/443 |
| 2015/0188376 A1 | 7/2015 | Yamaguchi et al. | |
| 2016/0285335 A1* | 9/2016 | Watanabe | H02K 15/0068 |
| 2018/0248440 A1 | 8/2018 | Yamashita et al. | |
| 2018/0262075 A1* | 9/2018 | Csoti | H02K 3/50 |
| 2019/0157934 A1* | 5/2019 | Kawaguchi | H02K 3/522 |
| 2020/0195083 A1* | 6/2020 | Ueno | H02K 5/1732 |
| 2020/0212768 A1* | 7/2020 | Guardiola | H02K 3/522 |
| 2020/0235646 A1* | 7/2020 | Eguchi | H05K 1/0203 |
| 2020/0274405 A1* | 8/2020 | Csoti | H02K 15/0062 |
| 2020/0343781 A1* | 10/2020 | An | H01R 25/16 |
| 2021/0095651 A1* | 4/2021 | Yin | F04B 35/04 |
| 2021/0305853 A1* | 9/2021 | Takahashi | H02K 5/225 |
| 2021/0305874 A1* | 9/2021 | Yoshida | H02K 3/522 |
| 2021/0384789 A1* | 12/2021 | Mawatari | H02K 9/19 |

FOREIGN PATENT DOCUMENTS

| | | |
|---|---|---|
| JP | 2014-87087 A | 5/2014 |
| KR | 10-2008-0050676 A | 6/2008 |
| KR | 10-2017-0011142 A | 2/2017 |
| KR | 10-2017-0052980 A | 5/2017 |
| KR | 10-2017-0079425 A | 7/2017 |
| WO | WO 2017/033917 A1 | 3/2017 |

* cited by examiner

[FIG. 1]
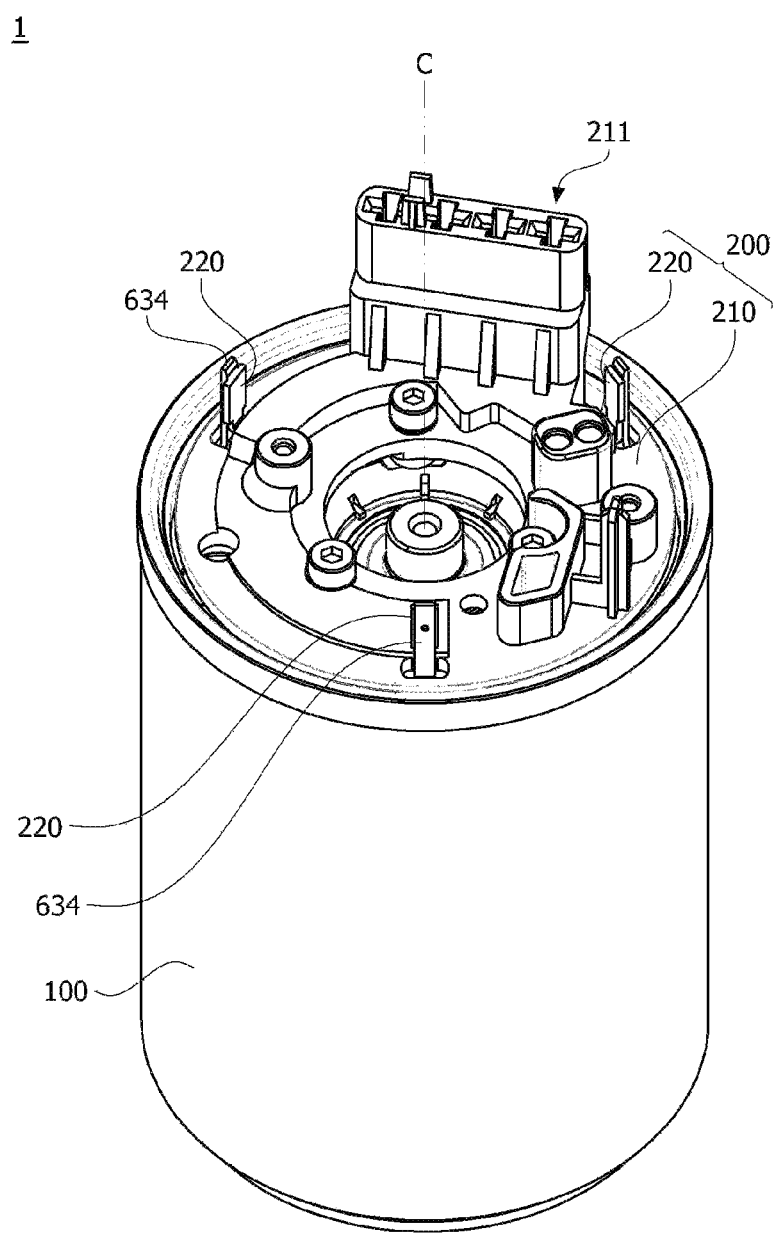

[FIG. 2]
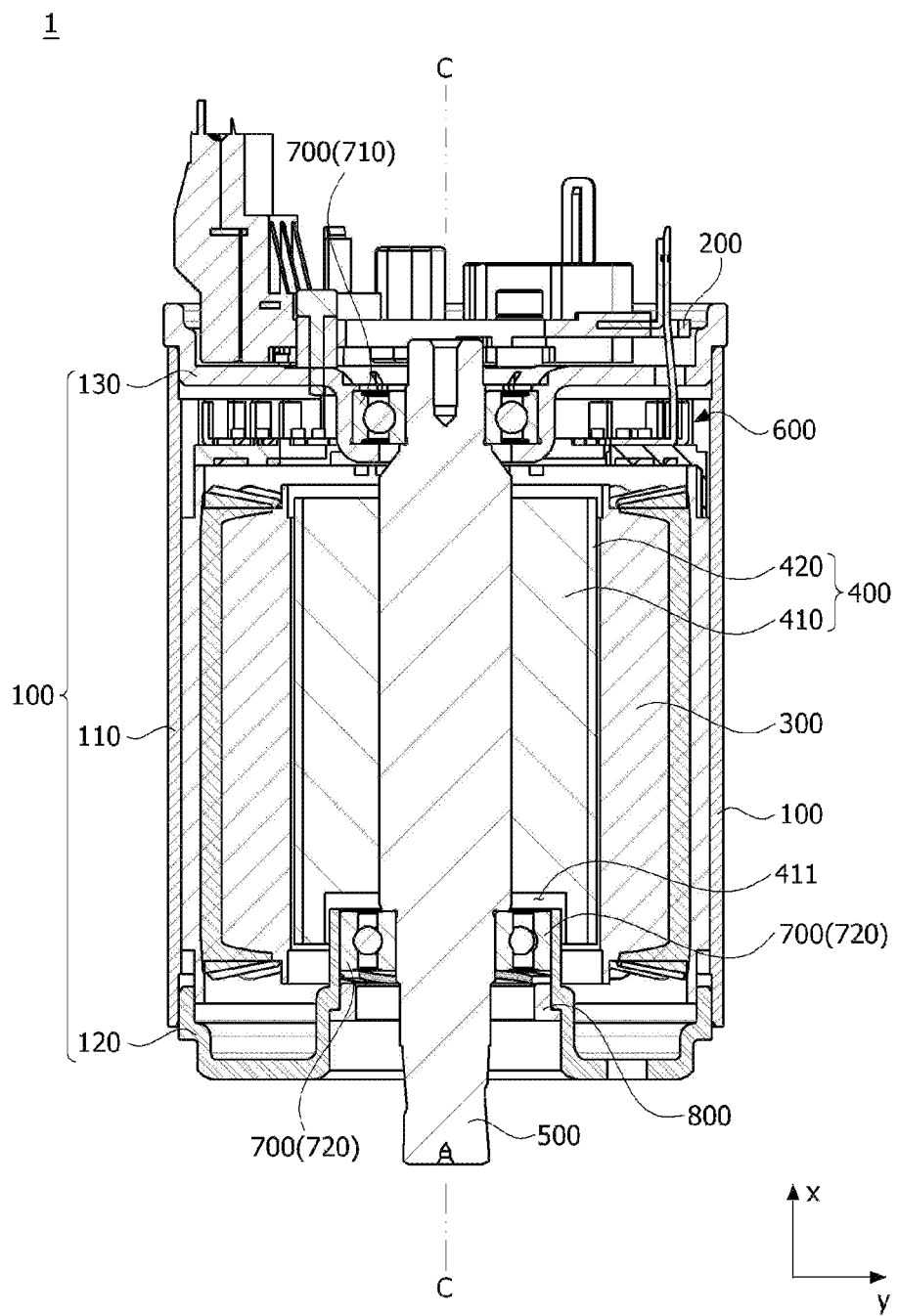

[FIG. 3]
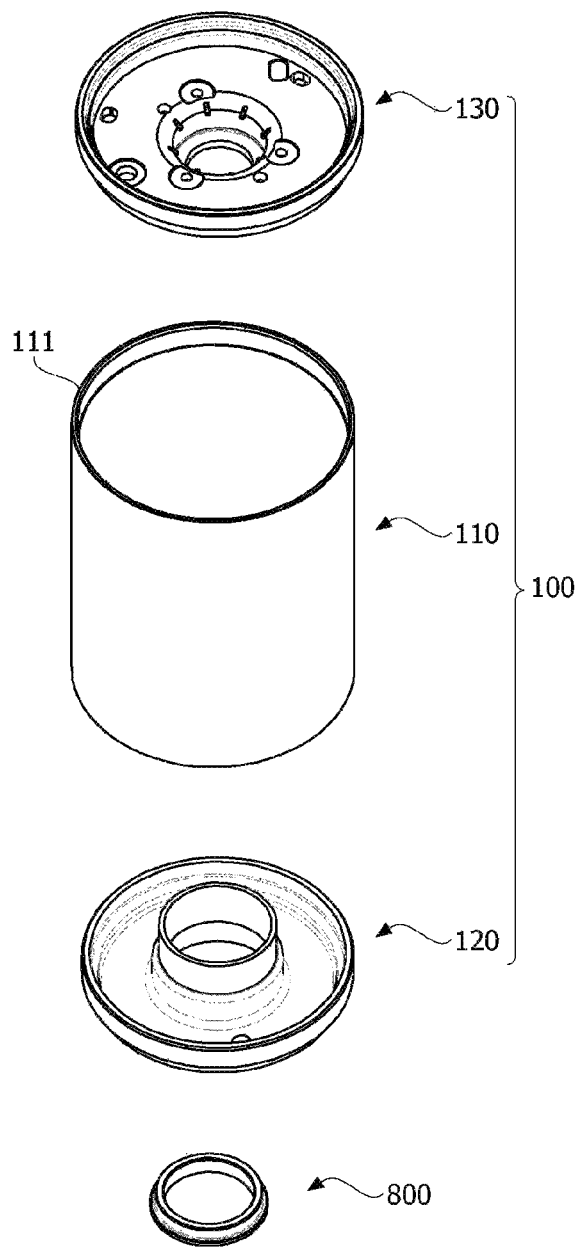

[FIG. 4]
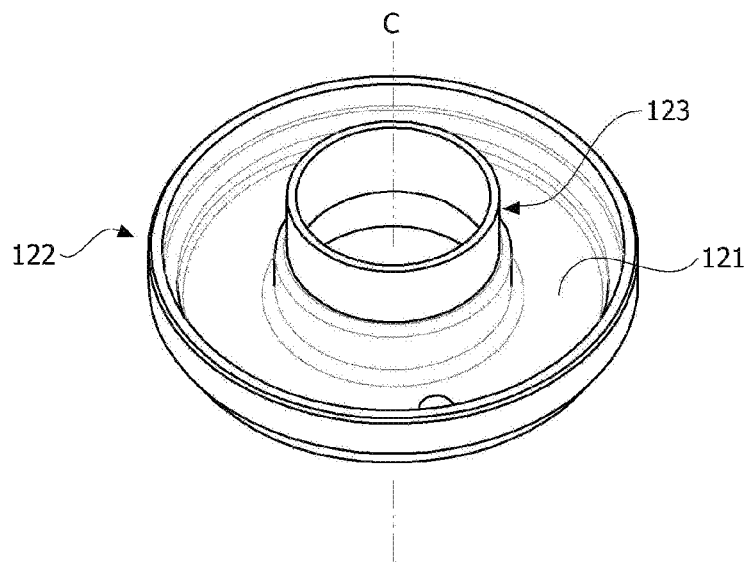
[FIG. 5]
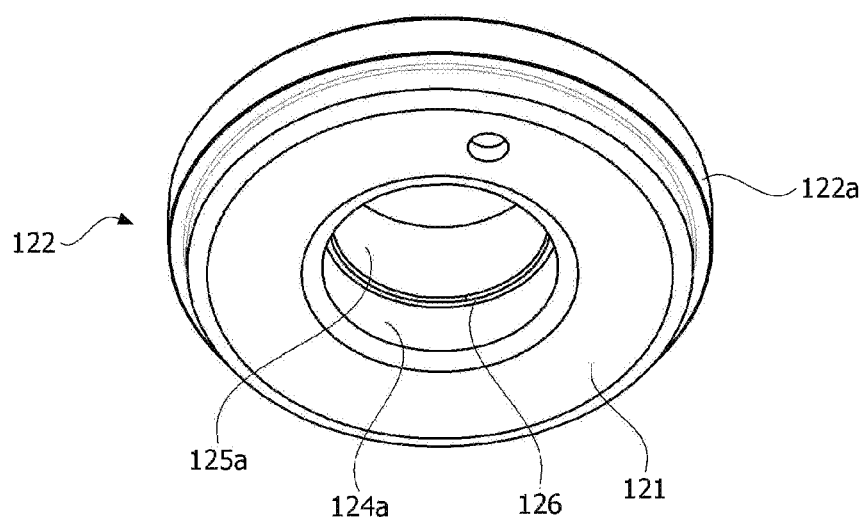

[FIG. 6]
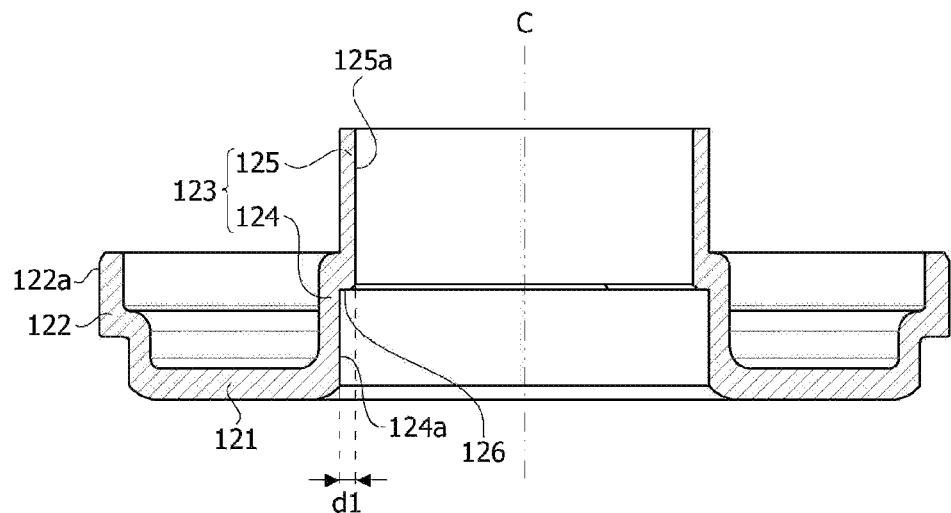
[FIG. 7]
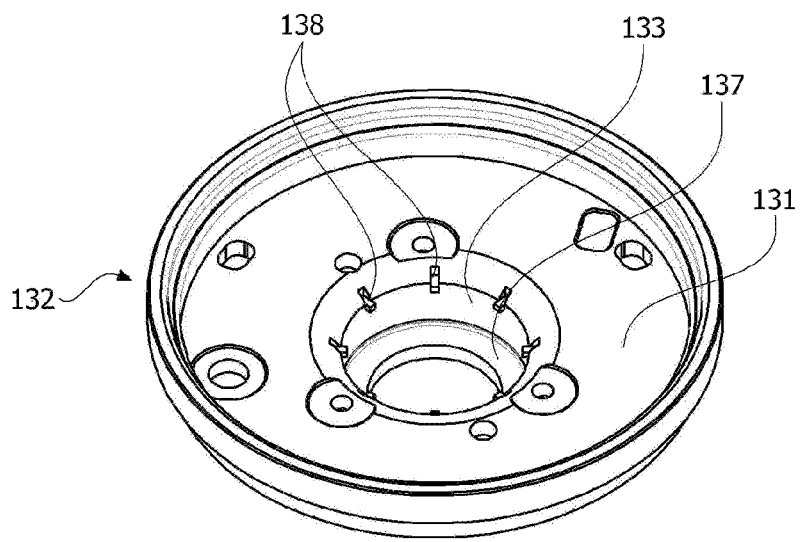

[FIG. 8]
130
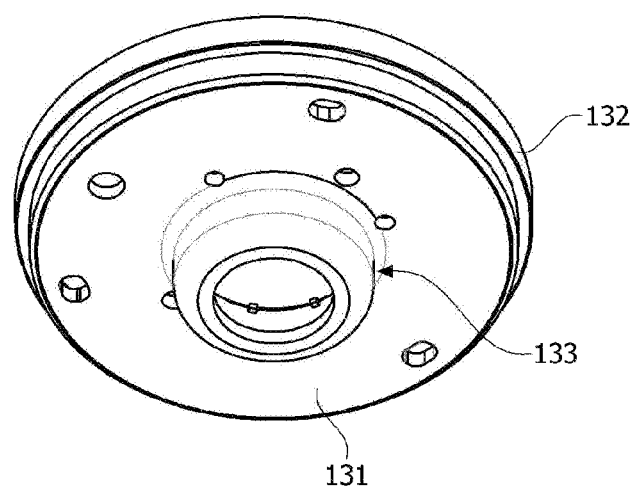
[FIG. 9]
130
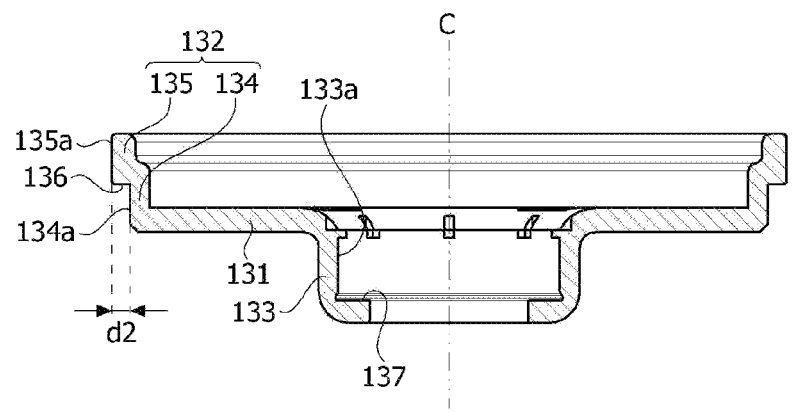

[FIG. 10]
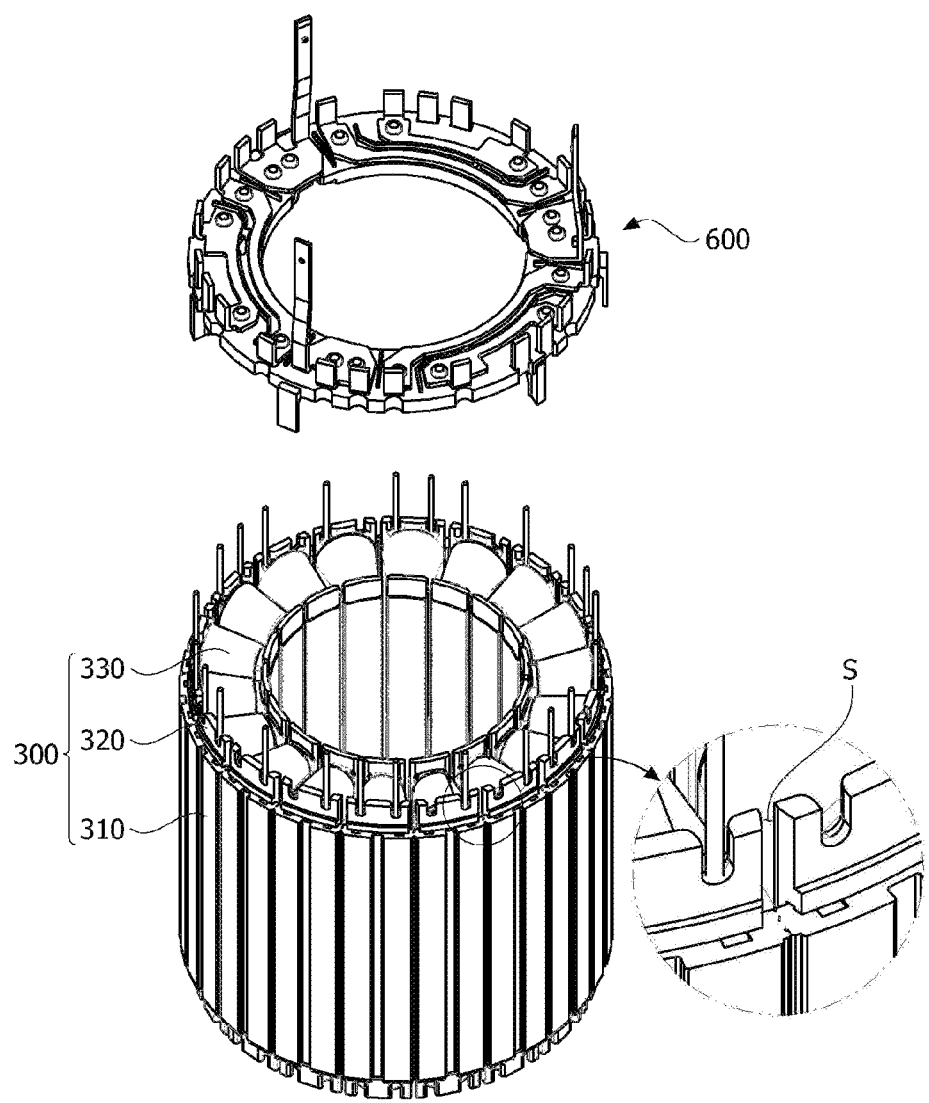

[FIG. 11]
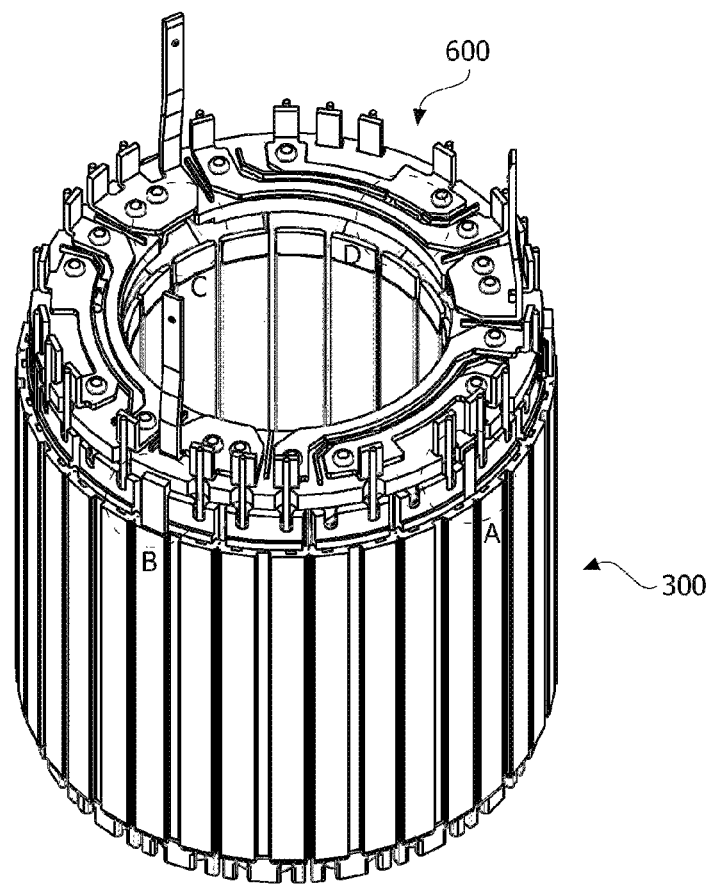

[FIG. 12]
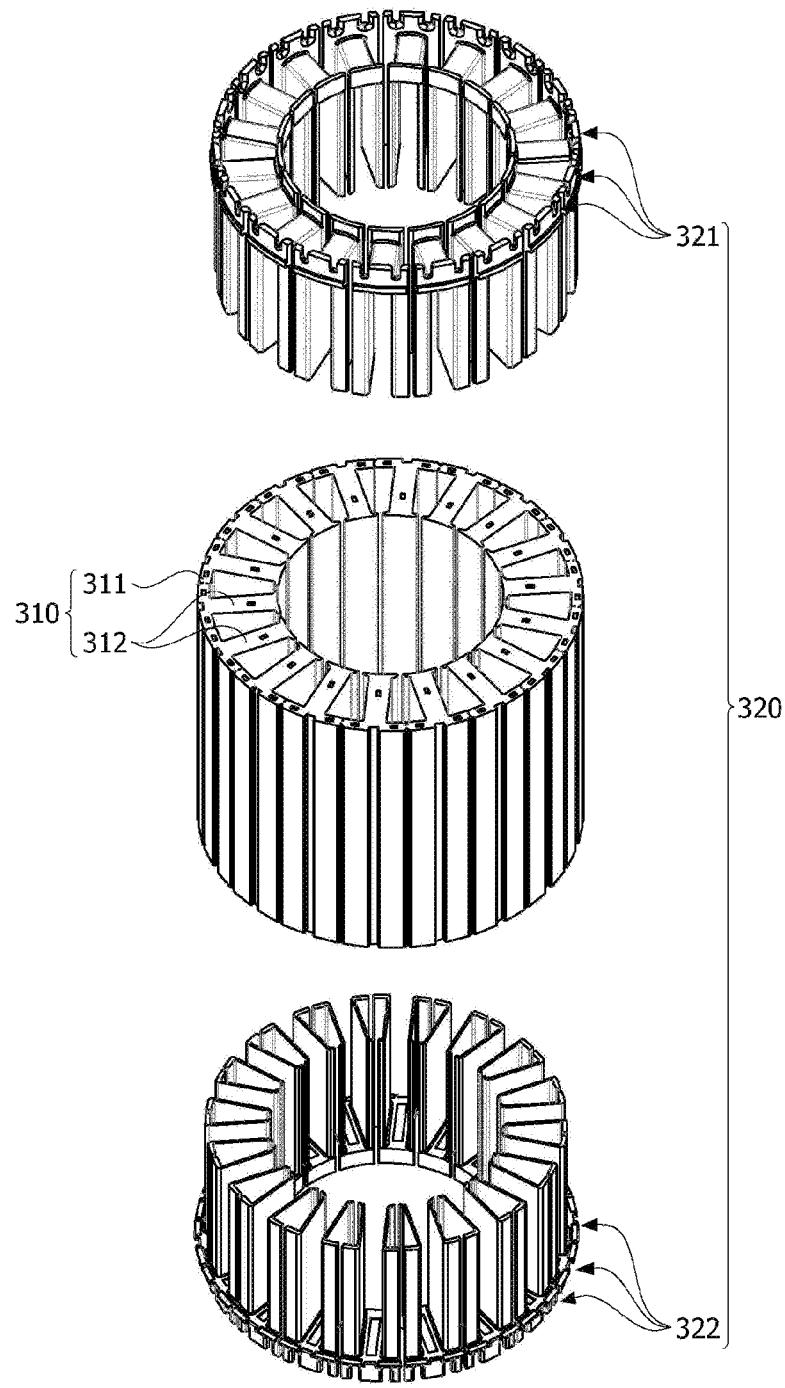

[FIG. 13]
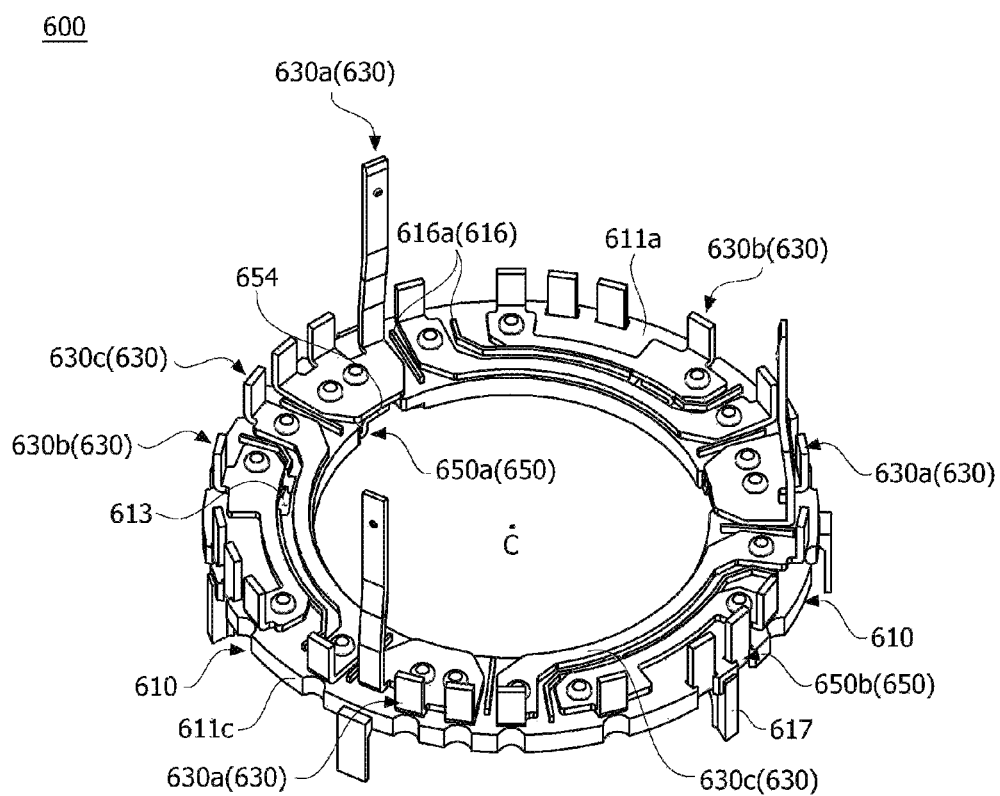

[FIG. 14]
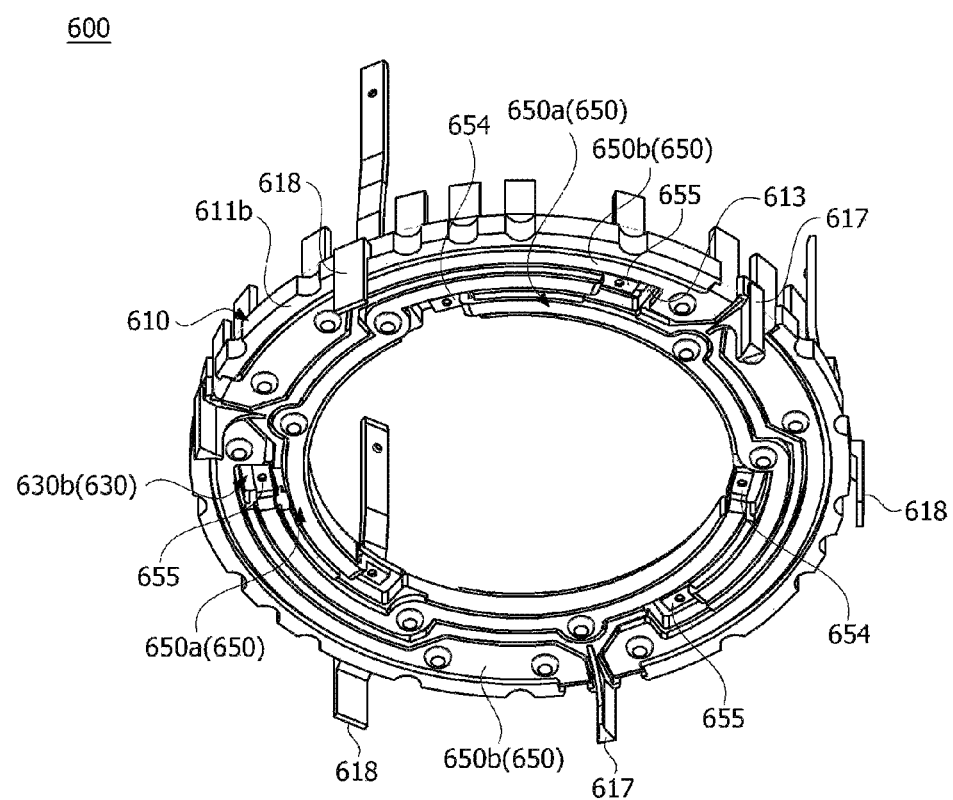

[FIG. 15]
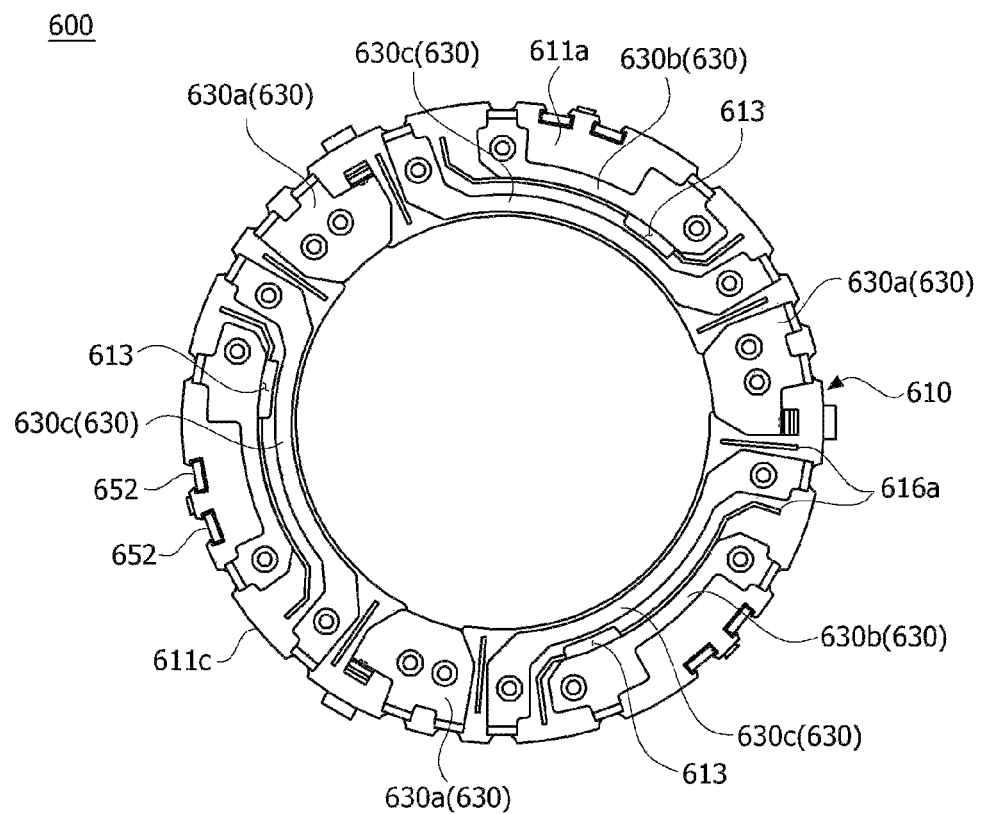

[FIG. 16]
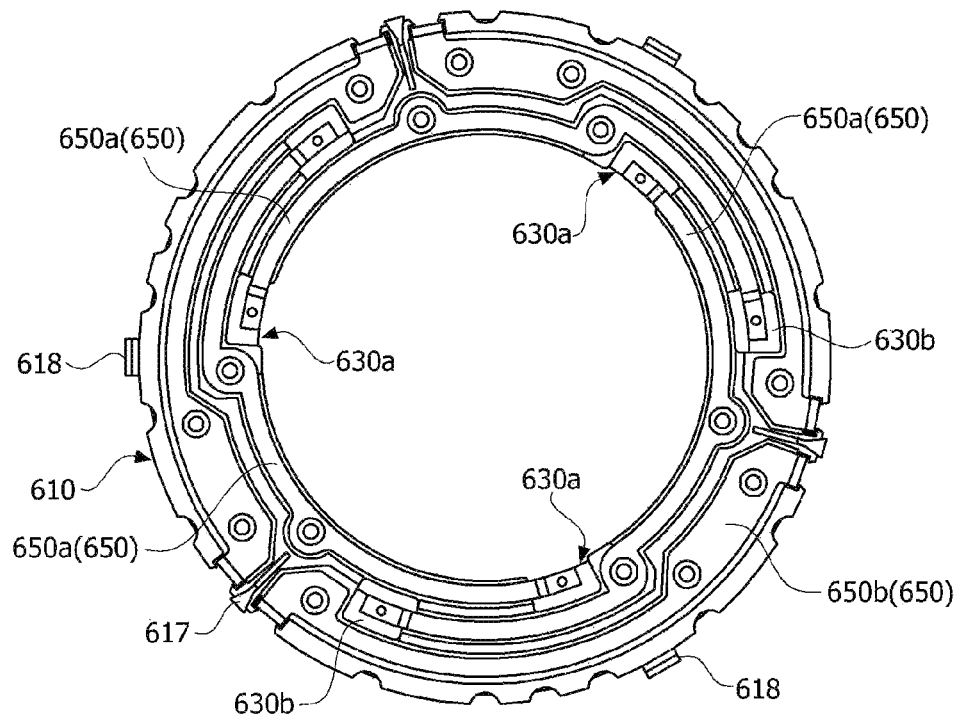

[FIG. 17]
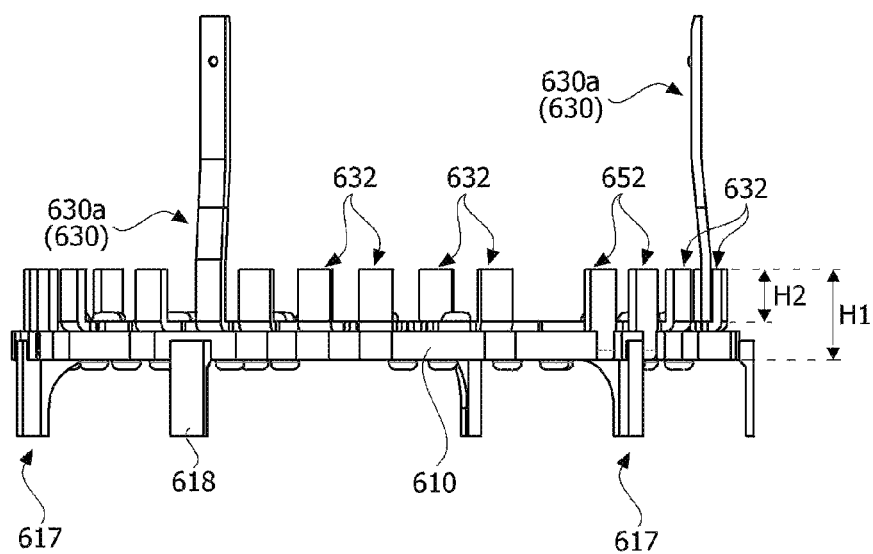

[FIG. 18]
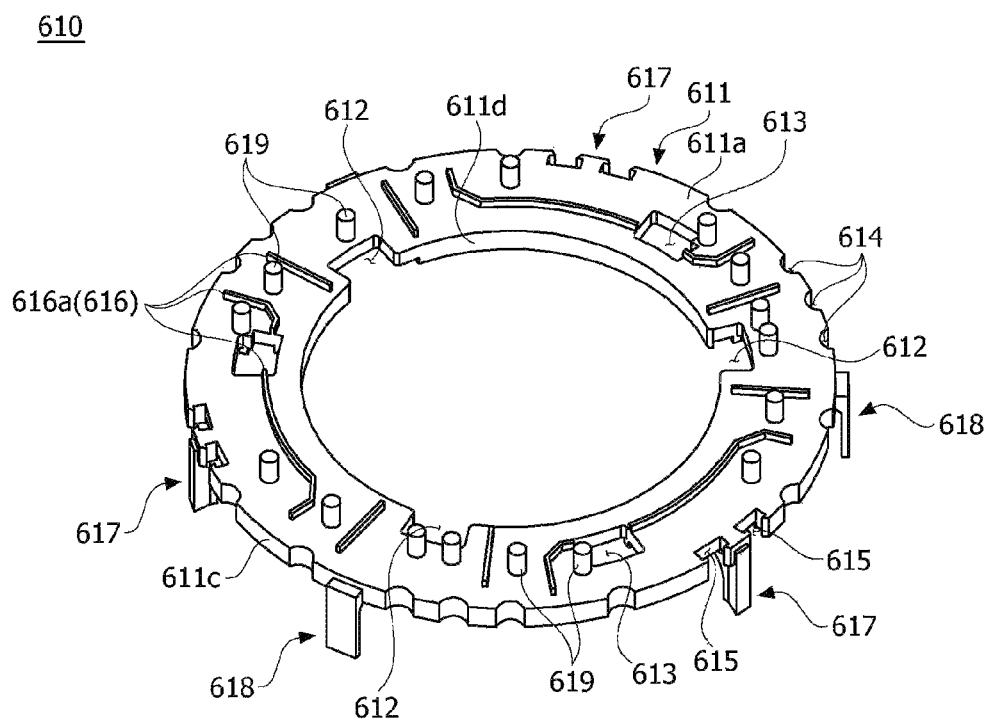

[FIG. 19]
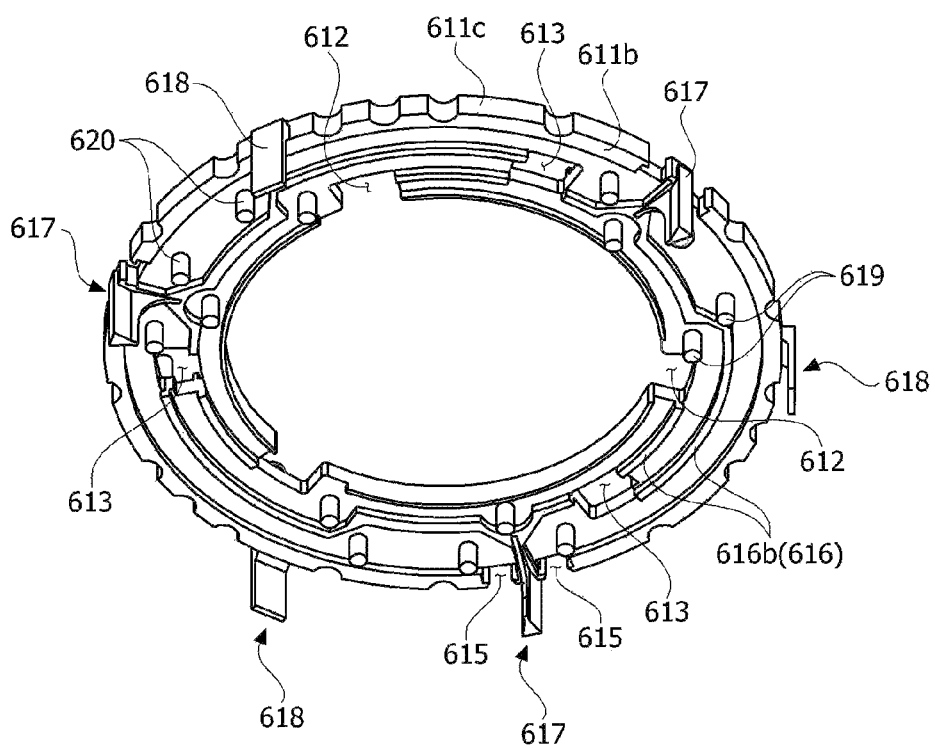

[FIG. 20]
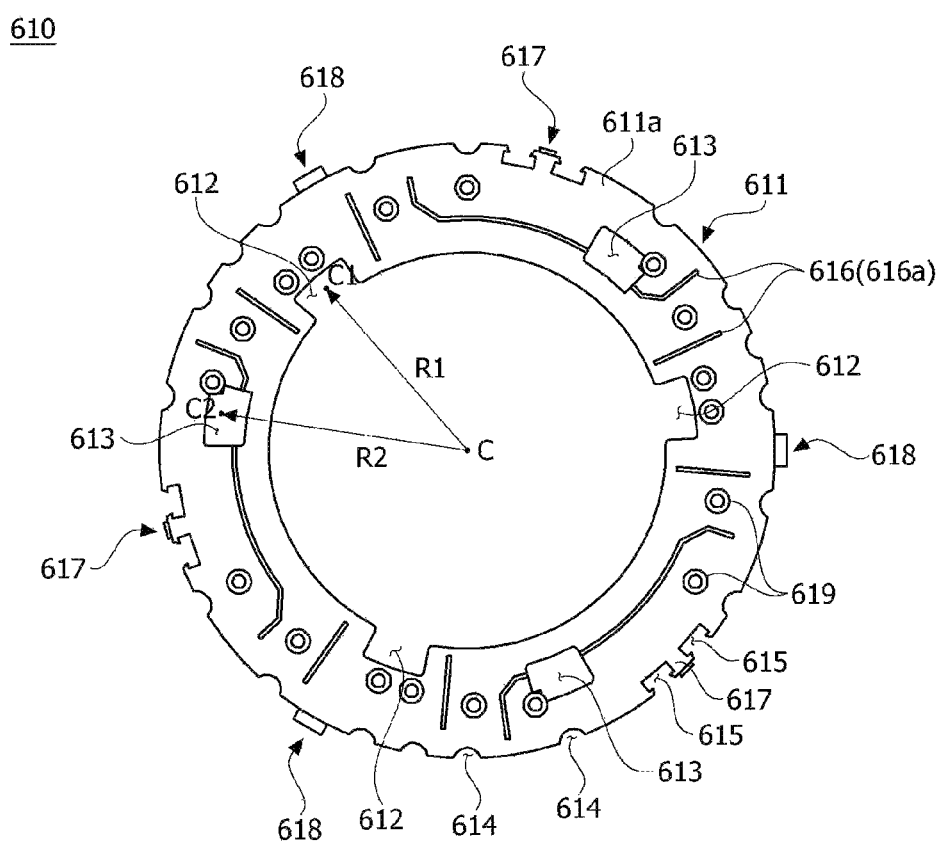

[FIG. 21]
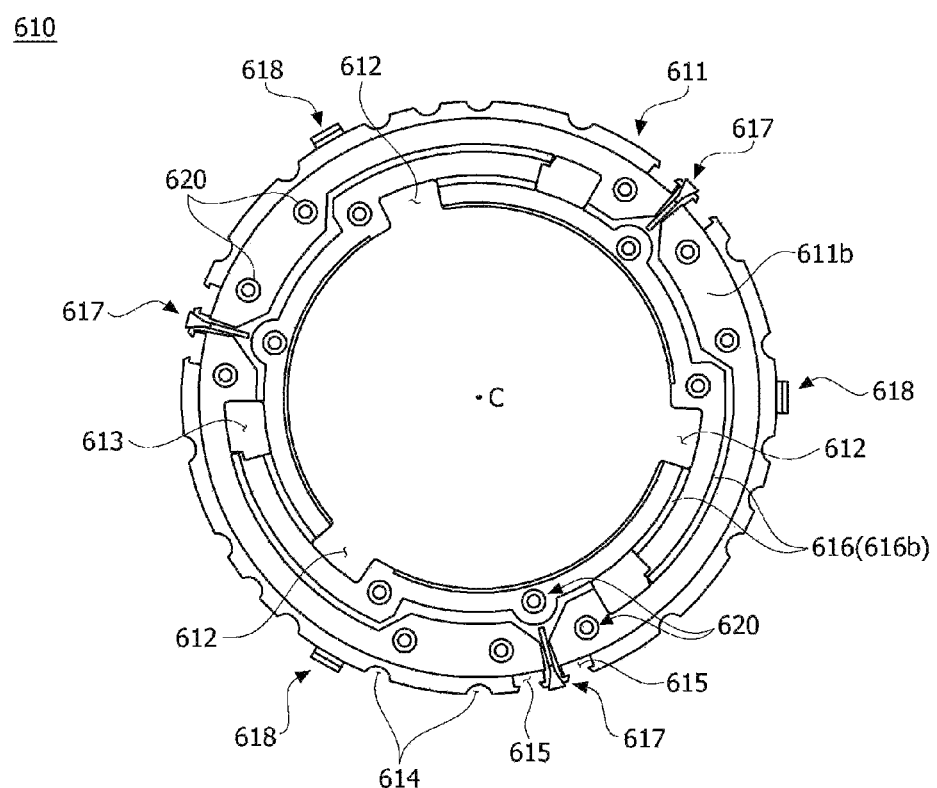

[FIG. 22]
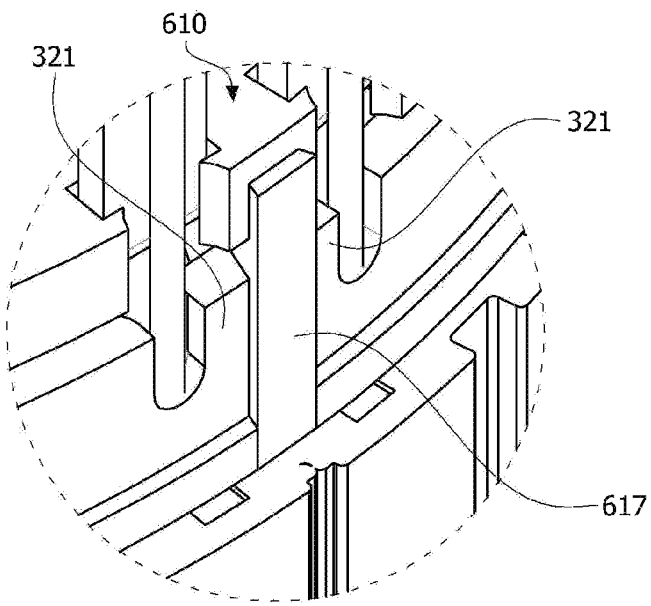
[FIG. 23]
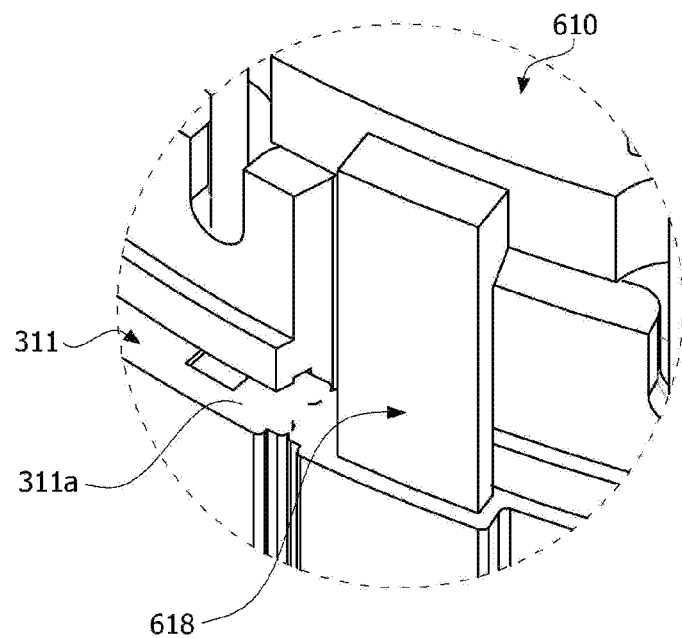

[FIG. 24]
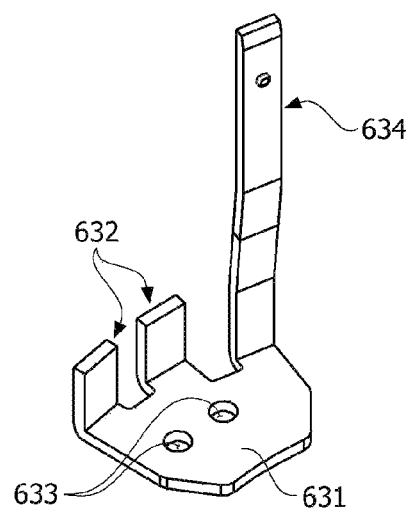
[FIG. 25]
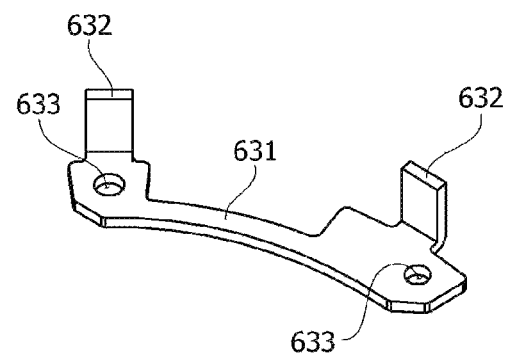

[FIG. 26]
630c
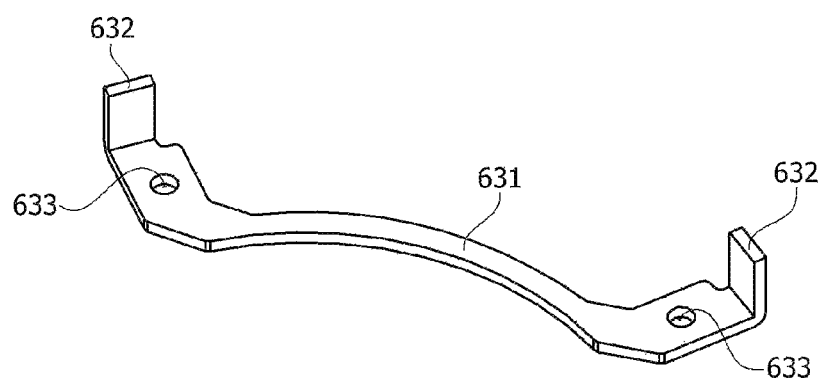

[FIG. 27]
650a
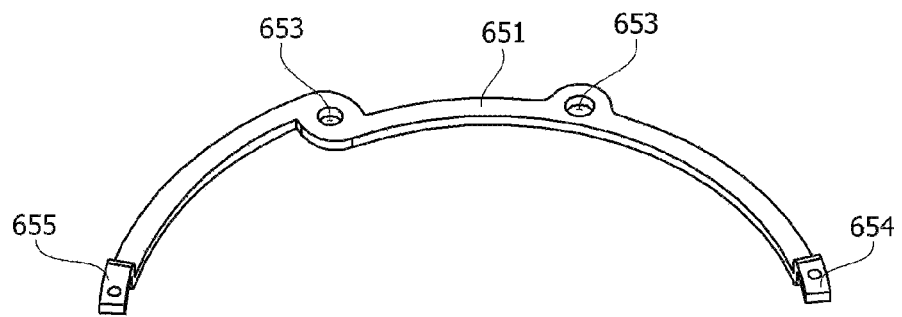
[FIG. 28]
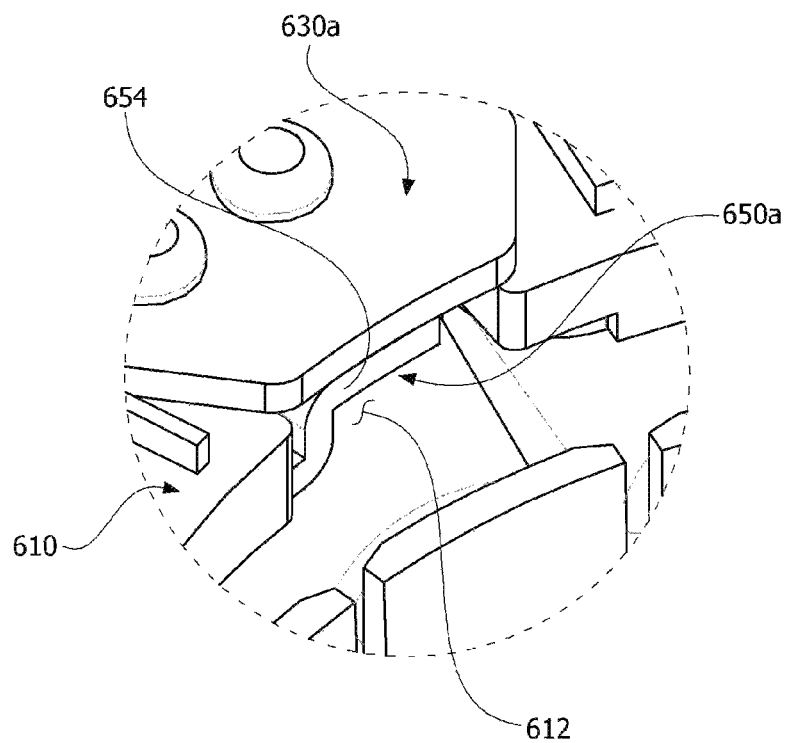

[FIG. 29]
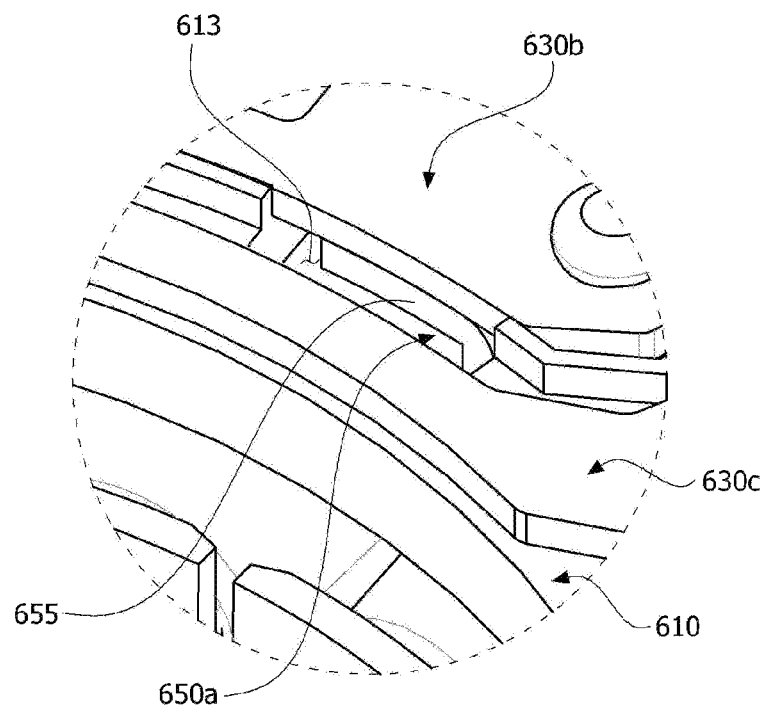
[FIG. 30]
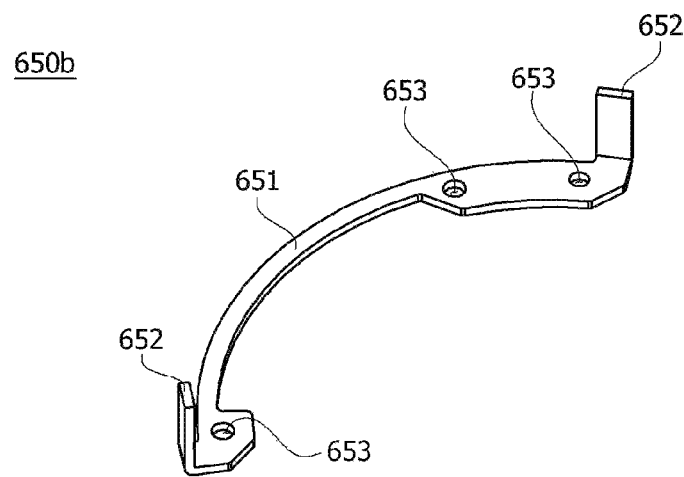

[FIG. 31]
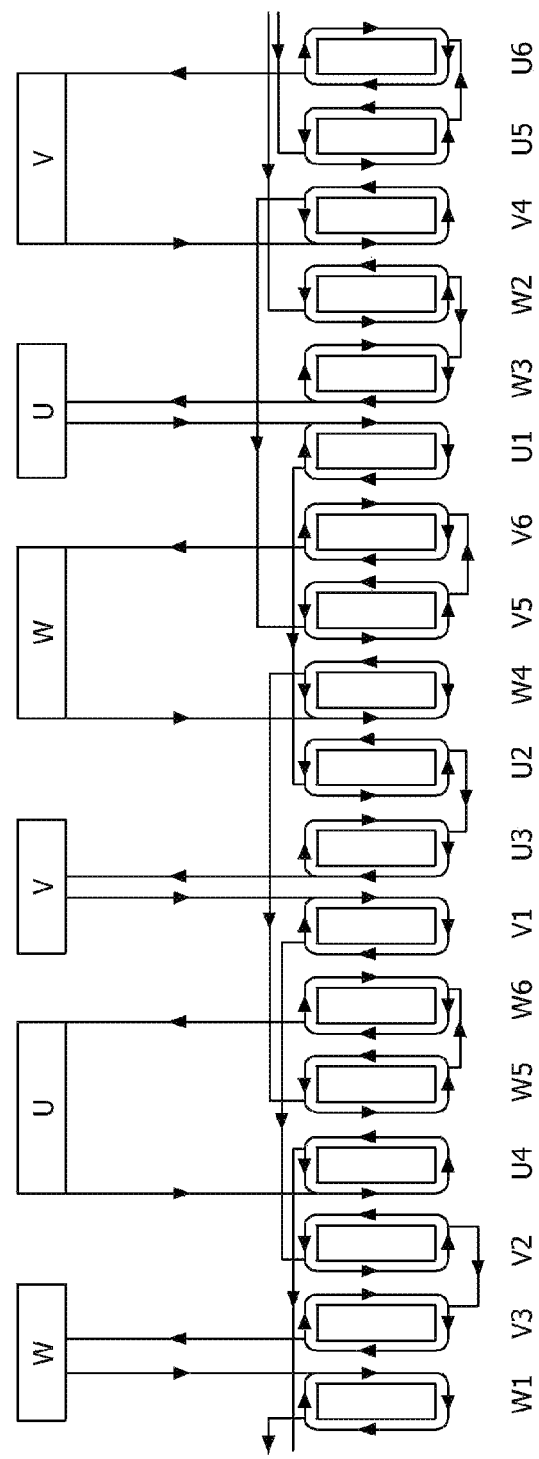

[FIG. 32]
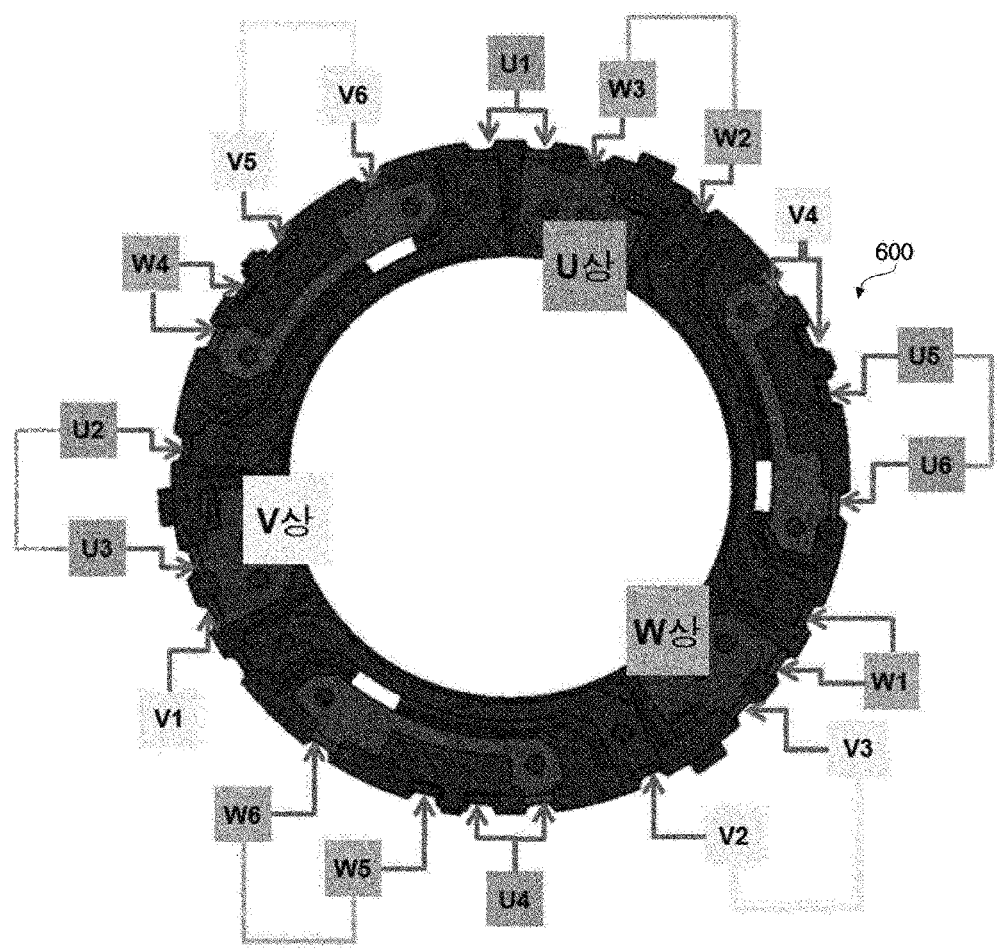

[FIG. 33]
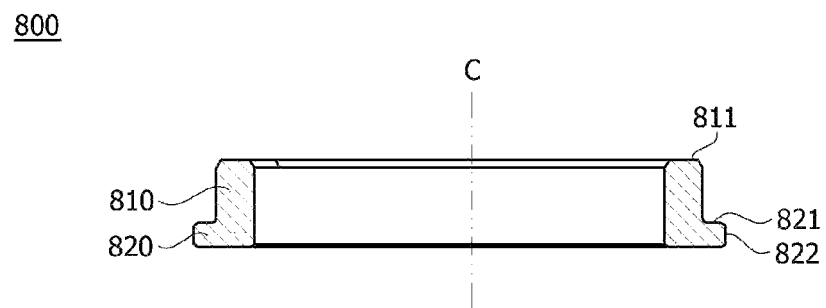

BUS BAR AND MOTOR COMPRISING SAME

CROSS REFERENCE TO RELATED APPLICATIONS

This application is the National Phase of PCT International Application No. PCT/KR2018/009499, filed on Aug. 20, 2018, which claims priority under 35 U.S.C. 119(a) to Patent Application Nos. 10-2017-0143445 and 10-2017-0143446, filed in the Republic of Korea on Oct. 31, 2017, all of which are hereby expressly incorporated by reference into the present application.

TECHNICAL FIELD

The present invention relates to a bus bar and a motor including the same.

BACKGROUND ART

In the case of a motor, a shaft which is rotatably formed, a rotor coupled to the shaft, and a stator fixed inside a housing are provided, and in this case, the stator is installed to be spaced apart from a circumference of the rotor by a gap. In addition, coils forming rotating magnetic fields are wound around the stator to induce an electrical interaction with the rotor to rotate the rotor.

The housing may be formed in a can type using a deep drawing method.

However, since the deep drawing method enables a product having a small size and a simple shape to be produced, there is a problem in that it cannot be used to manufacture a housing having a large size and a complicated shape.

In addition, in the case of the housing manufactured using the deep drawing method, there is a problem in that the housing is weak to a force applied in a radial direction. For example, in a case in which a stator is disposed using a hot press fit method in the housing manufactured using the deep drawing method, there is a problem in that the housing is deformed due to contraction of the housing.

Meanwhile, a bus bar electrically connected to coils is disposed on an upper end of the stator. The bus bar includes a bus bar housing approximately having a ring shape and bus bar terminals coupled to the bus bar housing and connected to the coils. The bus bar terminals may be formed by press-machining a sheet metal such as a copper plate.

Particularly, in a case in which the terminals are disposed to realize a U-phase, a V-phase, and a W-phase, arrangement of the plurality of terminals is spatially restricted. Accordingly, there is a problem in that the bus bar occupies a large space in a shaft direction in the motor. For example, the plurality of terminals are vertically disposed as three layers in consideration of fusing with the coils.

In addition, since connecting ends of the terminals electrically connected to the coils are formed in hook shapes, there is a problem in that the connecting ends occupy a large space in the motor when viewed from above (in a radial direction).

In addition, since differences in shape are generated between the terminals, there is a problem in that an amount of scraps is greatly increased when the terminals are formed. As a result, there is a problem in that a loss rate of a raw material is high and much cost and effort are needed to manufacture a mold

Technical Problem

The present invention is directed to providing a motor including a housing which is embodied with a complicated shape but is easily assembled.

The present invention is directed to providing a bus bar, in which space utilization is improved by forming a two-layer structure in which a plurality of terminals are disposed on each of an upper surface and a lower surface of a bus bar body, and a motor including the same.

In addition, the present invention is directed to providing a bus bar, in which shapes of the terminals are simplified and some parts of the terminals are unified to reduce a terminal manufacturing cost, and a motor including the same.

In addition, the present invention is directed to providing a bus bar, in which the terminals are coupled to a main body of the bus bar without using an additional coupling member, and a motor including the same.

Objectives that should be solved according to embodiments are not limited to the above described objectives, and other objectives which are not described above will be clearly understood by those skilled in the art from the following specification.

Technical Solution

One aspect of the present invention provides a bus bar including a main body, upper terminals disposed on an upper surface of the main body, and lower terminals disposed on a lower surface of the main body, wherein the upper terminals include first upper terminals and a second upper terminal, the lower terminals include a first lower terminal, the main body includes a first hole and a second hole which pass through the main body, and one end of the first lower terminal is connected to the first upper terminal through the first hole and the other end thereof is connected to the second upper terminal through the second hole.

In this case, the first hole may be disposed inward from the second hole.

In addition, the main body may further include a plurality of third holes formed to be recessed in an outer circumferential surface of the main body.

Each of the first upper terminals and the second upper terminal may include a body portion in contact with one surface of the main body, and a fusing portion extending upward from the body portion.

In this case, the first upper terminal may further include a power receiving portion extending upward from the body portion.

In addition, the main body may further include a first protrusion protruding from the upper surface of the main body, the body portion may include a through hole, and the first protrusion may be disposed inside the through hole.

In this case, an end portion of the first protrusion may be fused to the upper surface of the body portion.

In addition, the main body may further include a first protruding portion protruding from the upper surface of the main body, and the first protruding portion may be disposed between the upper terminals disposed adjacent to each other.

In this case, a height (H1) of the first protruding portion may be greater than a height (H2) of the body portion.

Meanwhile, the upper terminal may further include a third upper terminal, and the third upper terminal may include a body portion disposed on the upper surface of the main body, and a fusing portion extending upward from the body portion.

In this case, the lower terminals may further include a second lower terminal, wherein the second lower terminal may include a body portion disposed on the lower surface of the main body, and a fusing portion extending upward from the body portion, and the fusing portion of the second lower terminal may pass through the main body.

In addition, a protruding height (H1) of the fusing portion of the second lower terminal may be greater than a protruding height (H2) of the fusing portion of the upper terminal.

Meanwhile, the second upper terminal and the third upper terminal may be disposed between the first upper terminals.

In this case, the third upper terminal may be disposed inside the second upper terminal.

In addition, the fusing portion of the upper terminal and the fusing portion of the second lower terminal of the lower terminals may be disposed inward from an outer circumferential surface of the main body.

Meanwhile, the first lower terminal may include a body portion disposed on the lower surface of the main body, a through hole formed in the body portion, a first end portion connected to the first upper terminal through the first hole, and a second end portion connected to the second upper terminal through the second hole, wherein a second protrusion protruding from the lower surface of the main body may be disposed inside the through hole of the first lower terminal.

Another aspect of the present invention provides a motor including a shaft, a rotor through which the shaft passes, a stator disposed outside the rotor, and a bus bar disposed on the stator, wherein the bus bar includes a main body, upper terminals disposed on an upper surface of the main body, and lower terminals disposed on a lower surface of the main body, the upper terminals include first upper terminals, a second upper terminal, and a third upper terminal, the lower terminals include a first lower terminal and a second lower terminal, the main body includes a first hole and a second hole which pass through the main body, and one end of the first lower terminal is connected to the first upper terminal through the first hole and the other end thereof is connected to the second upper terminal through the second hole.

In addition, the stator may include a stator core, a plurality of insulators disposed on teeth of the stator core, and a coil connected to a fusing portion of the upper terminal, and a second protruding portion extending downward from the lower surface of the main body may be disposed between the insulators.

A third protruding portion extending downward from the lower surface of the main body may be in contact with an upper surface of the stator core.

The main body may further include a third hole formed to be recessed in an outer circumferential surface of the main body, and an end portion of the coil may pass through the third hole.

In this case, end portions of the coil may be electrically connected to a fusing portion of the upper terminal and a fusing portion of the second lower terminal.

In addition, the fusing portion of the upper terminal and the fusing portion of the second lower terminal of the lower terminals may be disposed inward from an outer circumferential surface of the main body.

Meanwhile, the second upper terminal and the third upper terminal may be disposed between the first upper terminals, and The third upper terminal may be disposed inside the second upper terminal.

In addition, the first upper terminal may include a body portion in contact with one surface of the main body, a fusing portion extending upward from the body portion, and a power receiving portion extending upward from the body portion.

Still another aspect of the present invention provides a motor including a shaft, a rotor through which the shaft passes, a stator disposed outside the rotor, a housing disposed outside the stator, and a cover assembly disposed on the housing, wherein the housing includes a housing body having a pipe shape, a first flange disposed on a lower portion of the housing body, and a second flange disposed on an upper portion of the housing body.

In this case, the first flange may include a first plate formed to have an annular shape, a first outer sidewall portion protruding upward from an outer side of the first plate, and a first inner sidewall portion protruding upward from an inner side of the first plate, wherein an outer circumferential surface of the first outer sidewall portion may be in contact with an inner circumferential surface of the housing body.

In addition, the rotor may include a rotor core, and a magnet disposed in the rotor core, wherein an end portion of the first inner sidewall portion may be disposed in a groove formed in a lower portion of the rotor core.

An inner circumferential surface of the first inner sidewall portion may be in contact with one side of the lower bearing.

The motor may further include a washer of which an end portion is in contact with a lower portion of the lower bearing, wherein the washer may include a washer main body having a pipe shape, and a flange portion protruding in a radial direction from an outer circumferential surface of the washer main body.

Meanwhile, the second flange may include a second plate formed to have an annular shape, a second outer sidewall portion protruding upward from an outer side of the second plate, and a second inner sidewall portion protruding downward from an inner side of the second plate, wherein the second outer sidewall portion may include a first outer circumferential surface and a second outer circumferential surface which are spaced apart from each other, and the first outer circumferential surface may be in contact with an inner circumferential surface of the housing body.

In addition, a second step surface disposed between the first outer circumferential surface and the second outer circumferential surface may be in contact with an upper surface of the housing body.

Advantageous Effects

In a motor according to embodiments, since a housing includes a housing body having a pipe shape, a first flange, and a second flange, a productivity of an assembly process can be secured, and a complicated structure of the housing can be realized.

In addition, since the housing body is coupled to the first flange and the second flange using a press fit method, a constant coupling force can be secured when compared to a coupling method using a conventional caulking process.

In a bus bar according to the embodiments and the motor including the same, since a two-layer structure in which a plurality of terminals are disposed on each of an upper surface and a lower surface of a bus bar body is realized, space utilization can be improved.

In addition, since terminals are disposed so as not to deviate from an outer circumferential surface of the bus bar body in a radial direction of the bus bar, horizontal space utilization can be improved.

In addition, since shapes of the terminals are simplified, and some parts of the terminals are unified, a terminal manufacturing cost can be reduced.

Accordingly, the compact motor can be realized.

In addition, the terminals can be coupled to a main body of the bus bar through heat fusing without using an additional coupling member.

Meanwhile, since second protruding portions of the bus bar are disposed between insulators, the bus bar can be prevented from rotating.

In addition, since third protruding portions of the bus bar are supported by an upper surface of a stator core, the third protruding portions can withstand a load applied to the bus bar in a shaft direction.

Useful advantages and effects of the embodiments are not limited to the above-described contents and will be more easily understood from descriptions of the specific embodiments.

DESCRIPTION OF DRAWINGS

FIG. 1 is a perspective view illustrating a motor according to an embodiment.

FIG. 2 is a cross-sectional view illustrating the motor according to the embodiment.

FIG. 3 is an exploded perspective view illustrating a housing and a washer of the motor according to the embodiment.

FIGS. 4 to 6 are a perspective view, a bottom perspective view, and a cross-sectional view illustrating a first flange of the housing disposed in the motor according to the embodiment.

FIGS. 7 to 9 are a perspective view, a bottom perspective view, and a cross-sectional view illustrating a second flange of the housing disposed in the motor according to the embodiment.

FIG. 10 is a perspective view illustrating a bus bar and a stator of the motor according to the embodiment.

FIG. 11 is an exploded perspective view illustrating the bus bar and the stator of the motor according to the embodiment.

FIG. 12 is a view illustrating a stator core of the stator and an insulator of the motor according to the embodiment.

FIG. 13 is a perspective view illustrating the bus bar of the motor according to the embodiment.

FIG. 14 is a bottom perspective view illustrating the bus bar of the motor according to the embodiment.

FIG. 15 is a plan view illustrating the bus bar of the motor according to the embodiment.

FIG. 16 is a bottom view illustrating the bus bar of the motor according to the embodiment.

FIG. 17 is a side view illustrating the bus bar of the motor according to the embodiment.

FIG. 18 is a perspective view illustrating a main body of the bus bar according to the embodiment.

FIG. 19 is a bottom perspective view illustrating the main body of the bus bar according to the embodiment.

FIG. 20 is a plan view illustrating the main body of the bus bar according to the embodiment.

FIG. 21 is a bottom view illustrating the main body of the bus bar according to the embodiment.

FIG. 22 is an enlarged view illustrating a region A of FIG. 11.

FIG. 23 is an enlarged view illustrating a region B of FIG. 11.

FIG. 24 is a view illustrating a first upper terminal of the motor according to the embodiment.

FIG. 25 is a view illustrating a second upper terminal of the motor according to the embodiment.

FIG. 26 is a view illustrating a third upper terminal of the motor according to the embodiment.

FIG. 27 is a view illustrating a first lower terminal of the motor according to the embodiment.

FIG. 28 is an enlarged view illustrating a region C of FIG. 11.

FIG. 29 is an enlarged view illustrating a region D of FIG. 11.

FIG. 30 is a view illustrating a second lower terminal of the motor according to the embodiment.

FIG. 31 is a view illustrating a delta connection of the motor according to the embodiment.

FIG. 32 is a view illustrating arrangement relationships between end portions of coils and the bus bar disposed in the motor according to the embodiment.

FIG. 33 is a cross-sectional view illustrating the washer of the motor according to the embodiment.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element, and a case in which the element is connected or coupled to another element with still another element disposed therebetween.

In addition, in a case in which any one element is described as being formed or disposed "on or under" another element, such a description includes both cases in which the two elements are formed or disposed in direct contact with each other and in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a perspective view illustrating a motor according to an embodiment, and FIG. 2 is a cross-sectional view illustrating the motor according to the embodiment. In FIG. 2, an x direction is referred to as a shaft direction, and a y direction is referred to as a radial direction.

Referring to FIGS. 1 and 2, a motor 1 according to the embodiment may include a housing 100, a cover assembly 200, a stator 300, a rotor 400, a shaft 500, a bus bar 600, and bearings 700. In this case, the bearings 700 may be divided into an upper bearing 710 and a lower bearing 720 according to an arrangement position. In addition, the motor 1 may further include a washer 800 supporting the lower bearing 720.

The stator 300, the rotor 400, the shaft 500, the bus bar 600, and the bearings 700 may be disposed in an accommodation space in the housing 100.

The housing 100 may include a housing body 110 having a pipe shape, a first flange 120 disposed on a lower portion of the housing body 110, and a second flange 130 disposed on an upper portion of the housing body 110. In this case, the first flange 120 and the second flange 130 may be coupled to the housing body 110 using a press fit method.

FIG. 3 is an exploded perspective view illustrating a housing and a washer of the motor according to the embodiment.

Referring to FIG. 3, the housing 100 may include the housing body 110 having the pipe shape, the first flange 120 disposed on the lower portion of the housing body 110 and the second flange 130 disposed on the upper portion of the housing body 110.

Accordingly, since the first flange 120 and the second flange 130 are coupled to the housing body 110, the accommodation space may be formed in the housing 100. In addition, as illustrated in FIG. 2, the stator 300, the rotor 400, the shaft 500, the bus bar 600, and the like may be disposed in the accommodation space.

The housing body 110 may be formed to have a cylindrical shape in which an opening is formed in each of the upper portion and the lower portion. For example, the housing body 110 may be formed to have the pipe shape. In this case, the housing body 110 may be formed of a metal material such as steel. For example, the housing body 110 may be formed of a steel plate cold commercial (SPCC) material, and a coefficient of expansion thereof may be $15*10^6/°C$.

The first flange 120 may be disposed to cover the opening of a lower side of the housing body 110. In this case, the first flange 120 may be formed of a metal material such as steel.

FIGS. 4 to 6 are a perspective view, a bottom perspective view, and a cross-sectional view illustrating the first flange of the housing disposed in the motor according to the embodiment.

Referring to FIGS. 4 to 6, the first flange 120 may include a first plate 121, a first outer sidewall portion 122, and a first inner sidewall portion 123. In this case, the first plate 121, the first outer sidewall portion 122, and the first inner sidewall portion 123 may be integrally formed.

The first plate 121 may be formed to have a predetermined thickness and an annular shape.

The first outer sidewall portion 122 may be formed to protrude upward from an outer side of the first plate 121. As illustrated in FIG. 2, an outer circumferential surface 122a of the first outer sidewall portion 122 may be in contact with an inner circumferential surface of the housing body 110.

Accordingly, the first outer sidewall portion 122 supports the housing body 110 to withstand a load applied to the housing body 110 in the radial direction.

The first inner sidewall portion 123 may be formed to protrude upward from an inner side of the first plate 121.

The lower bearing 720 may be disposed on an inner circumferential surface of the first inner sidewall portion 123.

The first inner sidewall portion 123 may include a first-first inner sidewall portion 124 and a first-second inner sidewall portion 125. For example, the first-first inner sidewall portion 124 and the first-second inner sidewall portion 125 may be formed by bending a part of the first inner sidewall portion 123 inward and bending a part of the part thereof upward.

As illustrated in FIG. 6, the first-first inner sidewall portion 124 may be formed to protrude upward from an inner side of the first plate 121. In addition, the first-second inner sidewall portion 125 may be formed to be bent inward from an end portion of the first-first inner sidewall portion 124 and bent to protrude upward.

A first inner circumferential surface 124a of the first-first inner sidewall portion 124 may be spaced apart from a second inner circumferential surface 125a of the first-second inner sidewall portion 125 by a predetermined spacing distance d1 in the radial direction. Accordingly, a first step surface 126 may be formed between the first-first inner sidewall portion 124 and the first-second inner sidewall portion 125.

The first inner circumferential surface 124a of the first-first inner sidewall portion 124 may be in contact with an outer circumferential surface of a flange portion 820 forming the washer 800.

One side of the lower bearing 720 may be disposed on the second inner circumferential surface 125a of the first-second inner sidewall portion 125. For example, the lower bearing 720 is disposed between the second inner circumferential surface 125a of the first-second inner sidewall portion 125 and an outer circumferential surface of the shaft 500. Accordingly, the second inner circumferential surface 125a of the first-second inner sidewall portion 125 may support an outer wheel of the lower bearing 720 in the radial direction.

The first step surface 126 may be in contact with one region of the washer 800. For example, since the washer 800 is coupled to a lower side of the first flange 120, the first step surface 126 may be in contact with an upper surface of the flange portion 820 forming the washer 800. Accordingly, the washer 800 may be inserted into the housing 100 to a depth preset by the first step surface 126.

The second flange 130 may be disposed to cover the opening of an upper side of the housing body 110. In this case, the second flange 130 may be formed of a metal material such as steel.

FIGS. 7 to 9 are a perspective view, a bottom perspective view, and a cross-sectional view illustrating the second flange of the housing disposed in the motor according to the embodiment.

Referring to FIGS. 7 to 9, the second flange 130 may include a second plate 131, a second outer sidewall portion 132, and a second inner sidewall portion 133. In this case, the second plate 131, the second outer sidewall portion 132, and the second inner sidewall portion 133 may be integrally formed.

The second plate 131 may be formed to have a predetermined thickness and an annular shape when viewed from above.

The second outer sidewall portion 132 may be formed to protrude upward from an outer side of the second plate 131.

The second outer sidewall portion 132 may include a second-first outer sidewall portion 134 and a second-second outer sidewall portion 135. For example, the second-first outer sidewall portion 134 and the second-second outer sidewall portion 135 may be formed by bending a part of the second inner sidewall portion 133 outward and bending a part of the part thereof upward.

As illustrated in FIG. 9, the second-first outer sidewall portion 134 may be formed to protrude upward from the outer side of the second plate 131. In addition, the second-second outer sidewall portion 135 may be bent outward from an end portion of the second-first outer sidewall portion 134 and bent to protrude upward from an end portion of the end portion thereof.

A first outer circumferential surface 134a of the second-first outer sidewall portion 134 may be in contact with the inner circumferential surface of the housing body 110. Accordingly, the second outer sidewall portion 132 may support the housing body 110 to withstand a load applied to the housing body 110 in the radial direction.

A second outer circumferential surface 135a of the second-second outer sidewall portion 135 may be spaced apart from the first outer circumferential surface 134a of the second-first outer sidewall portion 134 by a predetermined spacing distance d2 in the radial direction. As illustrated in FIG. 9, the first outer circumferential surface 134a may be disposed inward from the second outer circumferential surface 135a in the radial direction. Accordingly, a second step surface 136 may be formed between the second-first outer sidewall portion 134 and the second-second outer sidewall portion 135.

The second step surface 136 may be in contact with an upper surface 111 of the housing body 110. Accordingly, when the second flange 130 is coupled to the housing body 110, the second step surface 136 may be supported by the upper surface 111 of the housing body 110.

The second inner sidewall portion 133 may be formed to protrude downward from an inner side of the second plate 131.

One side of the lower bearing 720 may be disposed on an inner circumferential surface 133a of the second inner sidewall portion 133. For example, the inner circumferential surface 133a of the second inner sidewall portion 133 may support the upper bearing 710 in the radial direction.

Meanwhile, the second inner sidewall portion 133 may further include a seating surface 137 formed by bending an end portion of the second inner sidewall portion 133 inward. In addition, as an outer wheel of the upper bearing 710 is seated on the seating surface 137, the seating surface 137 may support the upper bearing 710.

In addition, after the first upper bearing 710 is seated on the seating surface 137, one region of the second inner sidewall portion 133 may be caulked. Accordingly, support protrusions 138 protruding inward may be formed on the second inner sidewall portion 133.

Accordingly, the first bearing 710 may be prevented from moving in the shaft direction by the seating surface 137 and the support protrusions 138.

The cover assembly 200 may be disposed on the housing 100. In this case, the cover assembly 200 may be referred to as a cover.

The cover assembly 200 may include a cover main body 210 on which a boss 211 is formed upward and a plurality of terminals 220 disposed in the cover main body 210.

The cover main body 210 may be disposed to cover the opening of the housing 100. In this case, the cover main body 210 may be formed to have a circular plate shape and formed of an insulating material. For example, the cover main body 210 may be formed of a synthetic material such as mold.

The boss 211 may be formed to protrude upward from the cover main body 210. In addition, a space may be formed inside the boss 211. Accordingly, an external connector (not shown) may be coupled to the boss 211 so that electric power may be applied to the motor 1.

The terminals 220 may be disposed in the cover main body 210 using an insert injection method. In this case, one sides of the terminals 220 may be disposed inside the boss 211, and the other sides thereof may be disposed to be electrically connected to first upper terminals of the bus bar 600.

The stator 300 may be accommodated in the housing 100. In this case, the stator 300 may be supported by an inner circumferential surface of the housing 100. In addition, an electrical interaction is induced due to the stator 300 and the rotor 400.

FIG. 10 is a perspective view illustrating the bus bar and the stator of the motor according to the embodiment, FIG. 11 is an exploded perspective view illustrating the bus bar and the stator of the motor according to the embodiment, and FIG. 12 is a view illustrating a stator core of the stator and an insulator of the motor according to the embodiment.

Referring to FIGS. 10 to 12, the stator 300 may include a stator core 310, coils 330 wound around the stator core 310, insulators 320 disposed between the stator core 310 and the coils 330. In this case, a wire of which an outer circumferential surface is coated may be provided as the coil 330.

The coils 330 configured to generate rotating magnetic fields may be wound around the stator core 310. In this case, one core may be provided as the stator core 310, or a plurality of divided cores may be coupled to be provided as the stator core 310.

The stator core 310 may be formed by stacking a plurality of thin steel plates on each other, but is not necessary limited thereto. For example, one single product may also be formed as the stator core 310.

The stator core 310 may include a yoke 311 having a cylindrical shape and a plurality of teeth 312.

In this case, the teeth 312 may be disposed to protrude from the yoke 311 having the cylindrical shape toward a center C of the stator core 310. In addition, the plurality of teeth 312 may be disposed to be spaced apart from each other in a circumferential direction of the yoke 311. Accordingly, slots may be formed between the teeth 312.

Meanwhile, the teeth 312 may be formed to face magnets of the rotor 400. In addition, the coils 330 are wound around the teeth 312.

The insulators 320 insulate the stator core 310 from the coils 330. In this case, the insulators 320 may be formed of a resin material. Accordingly, the insulators 320 may be disposed between the stator core 310 and the coils 330.

Referring to FIGS. 10 and 12, the insulators 320 may include a plurality of first insulators 321 disposed on an upper portion of the stator core 310 and a plurality of second insulators 322 disposed on a lower portion of the stator core 310. In this case, the first insulators 321 and the second insulators 322 may be disposed between the teeth 312 of the stator core 310.

As illustrated in FIG. 12, the plurality of first insulators 321 may be disposed to be spaced apart from each other. Accordingly, as illustrated in FIG. 10, since the first insulators 321 are spaced apart from each other, spaces S are formed between the first insulators 321.

The insulators 320 according to the embodiment including the first insulators 321 and the second insulators 322 coupled to the upper portion and the lower portion of the stator core 310 are illustrated as an example but are not necessarily limited thereto. For example, the insulators 320 may also be disposed on the stator core 310.

Accordingly, the coils 330 may be wound around the stator core 310 on which the insulators 320 are disposed. In addition, the coils 330 may generate rotating magnetic fields due to electric power supplied to the coils 330.

In this case, end portions of the coils 330 wound around the insulators 320 may be disposed to be exposed upward. In addition, the end portions of the coils 330 may be connected to the bus bar 600.

The rotor 400 may be disposed inside the stator 300, and the shaft 500 may be coupled to a central portion of the rotor 400. In this case, the rotor 400 may be rotatably disposed inside the stator 300.

The rotor 400 includes a rotor core 410 and magnets 420. A plurality of thin steel plates may be stacked on each other to be provided as the rotor core 410, or the rotor core 410 may have one cylindrical shape. A hole into which the shaft 500 is inserted may be formed at a center of the rotor core 410. Protrusions configured to guide arrangement of the magnets 420 may protrude from an outer circumferential surface of the rotor core 410. The magnets 420 may be attached to the outer circumferential surface of the rotor core 410. The plurality of magnets 420 may be disposed at predetermined intervals along a circumference of the rotor core 410. In addition, the rotor 400 may also be formed by inserting the magnets 420 into pockets of the rotor core 410.

Accordingly, the rotor 400 rotates due to an electrical interaction between the coils 330 and the magnets, and when the rotor 400 rotates, the shaft 500 rotates together to generate a driving force.

Meanwhile, the rotor 400 may also include a can member disposed to surround the magnets to fix the magnets such that the magnets are not separated from the rotor core. The can member may prevent the magnets from being externally exposed.

Referring to FIG. 2, the rotor core 410 may include a groove 411 formed in an inner side of a lower portion of the rotor core 410.

An end portion of the first-second inner sidewall portion 125 may be disposed in the groove 411. In addition, the lower bearing 720 may be disposed on the inner circumferential surface 125a of the first-second inner sidewall portion 125. Accordingly, space utilization of the motor 1 can be improved.

The shaft 500 may be disposed in the housing 100 to be rotatable by the bearings 700 disposed on the outer circumferential surface of the shaft 500.

The shaft 500 is disposed to pass through the center of the rotor 400.

Referring to FIGS. 10 and 11, the bus bar 600 may be disposed on the stator 300. In addition, the bus bar 600 may be electrically connected to the coils 330 of the stator 300. Accordingly, the bus bar 600 transmits electric power provided externally to the coils 330.

FIG. 13 is a perspective view illustrating the bus bar of the motor according to the embodiment, FIG. 14 is a bottom perspective view illustrating the bus bar of the motor according to the embodiment, FIG. 15 is a plan view illustrating the bus bar of the motor according to the embodiment, FIG. 16 is a bottom view illustrating the bus bar of the motor according to the embodiment, and FIG. 17 is a side view illustrating the bus bar of the motor according to the embodiment.

Referring to FIGS. 13 to 17, the bus bar 600 may include a bus bar body 610, upper terminals 630 disposed on an upper surface of the bus bar body 610, and lower terminals 650 disposed on a lower surface of the bus bar body 610. In this case, the upper terminals 630 may include first upper terminals 630a, second upper terminals 630b, and third upper terminals 630c. In addition, the lower terminals 650 may include first lower terminals 650a and second lower terminals 650b.

In this case, the bus bar 600 may have a two-layer structure in which the upper terminals 630 and the lower terminals 650 are disposed on the upper surface and the lower surface of the bus bar body 610. Accordingly, space utilization of the motor 1 can be improved in the shaft direction. In this case, the shaft direction may be referred to as a longitudinal direction of the shaft 500. In addition, the radial direction may be referred to as a direction perpendicular to the shaft direction.

FIG. 18 is a perspective view illustrating a main body of the bus bar according to the embodiment, FIG. 19 is a bottom perspective view illustrating the main body of the bus bar according to the embodiment, FIG. 20 is a plan view illustrating the main body of the bus bar according to the embodiment, and FIG. 21 is a bottom view illustrating the main body of the bus bar according to the embodiment.

The bus bar body 610 may be formed of an insulating material. For example, the bus bar body 610 may be formed of a synthetic resin such as mold.

Referring to FIGS. 18 to 21, the bus bar body 610 may include a body 611, first holes 612, and second holes 613. In addition, the bus bar body 610 may further include third holes 614, fourth holes 615, first protruding portions 616, second protruding portions 617, third protruding portions 618, first protrusions 619, and second protrusions 620.

The body 611 may be formed to have an annular shape having a predetermined thickness. Accordingly, the body 611 may include an upper surface 611a, a lower surface 611b, an outer circumferential surface 611c, and an inner circumferential surface 611d.

The first hole 612 and the second hole 613 may be formed to pass through the body 611 of the bus bar body 610 in the shaft direction.

The first hole 612 may be disposed inward from the second hole 613 in the radial direction. As illustrated in FIG. 20, when a radius from a center C of the bus bar body 610 to a center C1 of the first hole 612 is referred to as R1, and a radius from the center C of the bus bar body 610 to a center C2 of the second hole 613 is referred to as R2, R2 is greater than R1.

In this case, the second hole 613 may be formed to be recessed from the inner circumferential surface 611d of the body 611.

The end portion, which protrudes upward from the stator 300, of the coil 330 may be disposed in the third hole 614. Accordingly, the third hole 614 may guide the arrangement position of the end portion of the coil 330. In this case, the end portion of the coil 330 may pass through the third hole 614.

The third hole 614 may be formed to pass through the body 611 of the bus bar body 610 in the shaft direction. As illustrated in FIGS. 18 to 21, the third hole 614 may be formed to be recessed inward from the outer circumferential surface 611c of the body 611. Accordingly, the third hole 614 may be further outward than the first hole 612 in the radial direction. In addition, the plurality of third holes 614 may be disposed along the outer circumferential surface 611c to be spaced apart from each other in the circumferential direction.

One regions of the second lower terminals 650b may be disposed in the fourth holes 615. That is, fusing portions 652 of the second lower terminals 650b may be disposed inside the fourth holes 615.

The fourth hole 615 may be formed to pass through the body 611 of the bus bar body 610 in the shaft direction. As illustrated in FIGS. 18 to 21, the fourth hole 615 may be formed to be recessed from the outer circumferential surface 611c of the body 611. In this case, the fourth hole 615 may be disposed inward from the third hole 614 in consideration of electrical connection between the end portion of the coil 330 and the second lower terminal 650b. For example, the fourth hole 615 may be formed to be recessed from the outer circumferential surface 611c of the body 611 to be disposed inward from the third hole 614.

The first protruding portion 616 may be disposed between the terminals 630 and 650 to prevent the terminals 630 and 650 from being electrically connected. In this case, a height of the first protruding portion 616 may be greater than a height of a body portion 631. However, the height of the first protruding portion 616 is not necessarily limited thereto, and the height of the first protruding portion 616 may be equal to the height of the body portion 631.

In this case, the first protruding portions 616 may be divided into first upper protruding portions 616a disposed on the upper surface 611a of the body 611 and first lower protruding portions 616b disposed on the lower surface 611b of the body 611 according to an arrangement position.

The first upper protruding portion 616a may be formed to protrude upward from the upper surface 611a of the body 611. In this case, the first upper protruding portion 616a may be disposed between the upper terminal 630 and the other terminal 630 disposed adjacent to the upper terminal 630.

The first lower protruding portion 616b may be formed to protrude downward from the lower surface 611b of the body 611. In this case, the first lower protruding portion 616b may be disposed between the lower terminal 650 and the other lower terminal disposed adjacent to the lower terminal 650.

The second protruding portions 617 may be formed to protrude downward from the body 611. In this case, three second protruding portions 617 may be provided and disposed at intervals of 120° with respect to the center C.

As illustrated in FIG. 22, the second protruding portion 617 may be disposed in the space S formed between the first insulators 321. Accordingly, the second protruding portion 617 can prevent the bus bar 600 from rotating.

The second protruding portion 617 may be formed to have a triangular shape when viewed from below. However, the second protruding portion 617 is not necessarily limited thereto, and may also be formed to have another shape in consideration of a shape of the first insulator 321.

As illustrated in FIG. 21, the second protruding portion 617 may be formed between the fourth holes 615.

The third protruding portion 618 may be formed to protrude downward from the body 611.

As illustrated in FIG. 23, an end portion of the third protruding portion 618 may be supported by an upper surface 311a of the yoke 311. Accordingly, the third protruding portion 618 may withstand a load applied to the bus bar 600 in the shaft direction.

The first protrusions 619 may protrude from the upper surface 611a of the body 611. In addition, the first protrusions 619 may be coupled to the upper terminals 630.

Accordingly, the plurality of first protrusions 619 may guide the upper terminals 630 to be assembled at preset positions.

In addition, an end portion of the first protrusion 619 is fused to the upper terminal 630 by heating so that the upper terminal 630 is fixed to the bus bar body 610.

The second protrusions 620 may protrude from a lower surface 611b of the body 611. In addition, the second protrusions 620 may be coupled to the lower terminals 650. Accordingly, the plurality of second protrusions 620 may guide the lower terminals 650 to be assembled at preset positions.

In addition, an end portion of the second protrusion 620 is fused to the lower terminal 650 by heating so that the lower terminal 650 is fixed to the bus bar body 610.

The upper terminal 630 may be disposed on the bus bar body 610. In this case, the upper terminal 630 may be disposed inward from the outer circumferential surface 611c of the bus bar body 610 when viewed from above. That is, since the upper terminal 630 does not deviate from an outer circumferential surface of the bus bar body 610, horizontal space utilization of the motor 1 is improved.

The upper terminal 630 may include the body portion 631, fusing portions 632, and through holes 633. In this case, the through holes 633 may be referred to as fifth holes.

The body portion 631 of the upper terminal 630 may be disposed on the upper surface 611a of the bus bar body 610.

The fusing portions 632 of the upper terminal 630 may protrude upward from the body portion 631. In this case, the fusing portions 632 are disposed inward from the outer circumferential surface 611c of the bus bar body 610. In addition, upper surfaces of the fusing portions 632 of the upper terminals 630 may be disposed to be coplanar with each other.

The through hole 633 of the upper terminal 630 may be formed in the body portion 631.

The first protrusion 619 is disposed in the through hole 633. In addition, as the end portion of the first protrusion 619 is fused, the upper terminal 630 is fixed to the bus bar body 610.

Meanwhile, three terminals may be used for each of the three kinds of the upper terminals 630. For example, three first upper terminals 630a, three second upper terminals 630b, and three third upper terminals 630c may be provided. Accordingly, shapes of the terminals of the motor 1 may be unified to reduce a manufacturing cost of the terminals.

Referring to FIG. 13, the second upper terminals 630b and the third upper terminals 630c may be disposed between the first upper terminals 630a in the circumferential direction. In this case, the body portion 631 of the third upper terminal 630c may be disposed inward from the body portion 631 of the second upper terminal 630b in the radial direction. As illustrated in FIG. 6, the body portion 631 of the second upper terminal 630b is disposed to be spaced apart from the body portion 631 of the third upper terminal 630c.

FIG. 24 is a view illustrating the first upper terminal of the motor according to the embodiment.

The first upper terminal 630a may include a body portion 631, fusing portions 632, through holes 633, and a power receiving portion 634. In this case, the body portion 631, the fusing portions 632, and the power receiving portion 634 may be integrally formed.

The body portion 631 may be formed to have a plate shape. In addition, the body portion 631 may be in contact with and supported by the upper surface 611a of the body 611.

The fusing portion 632 may be formed to protrude upward from one side of the body portion 631. Specifically, the fusing portion 632 may extend upward from an outer side surface of the body portion 631. In this case, the fusing portion 632 may be formed to have a plate shape.

As illustrated in FIG. 13, the fusing portion 632 is disposed inward from the outer circumferential surface 611c of the bus bar body 610.

The fusing portion 632 may be in contact with and electrically connected to the end portion of the coil 330 of which arrangement is guided by the third hole 614. In addition, a coupling force between the fusing portion 632 and the coil 330 may be increased through a fusing process.

The through hole 633 may be formed in the body portion 631.

The first protrusion 619 is disposed inside the through hole 633. In addition, as the end portion of the first protrusion 619 is fused, the first upper terminal 630a is fixed to the bus bar body 610.

As illustrated in FIG. 1, the power receiving portion 634 is electrically connected to one side of the terminal 220. Accordingly, electric power may be supplied to the coil 330 through the first upper terminal 630a.

The power receiving portion 634 may be formed to protrude from one side of the body portion 631. As illustrated in FIG. 24, the power receiving portion 634 may be disposed to be spaced apart from the fusing portion 632. In addition, the power receiving portion 634 may be disposed inward from the fusing portion 632 in the radial direction.

FIG. 25 is a view illustrating the second upper terminal of the motor according to the embodiment. When the second upper terminal 630b is described with reference to FIG. 25, since components of the second upper terminal 630b which are the same as those of the first upper terminal 630a are assigned to reference symbols which are the same as those of the components of the first upper terminal 630a, detailed descriptions thereof will be omitted.

The second upper terminal 630b may include a body portion 631, fusing portions 632, and through holes 633. In this case, the body portion 631 and the fusing portions 632 may be integrally formed.

The fusing portions 632 of the second upper terminal 630b may be formed to protrude upward from one side of the body portion 631. Specifically, the fusing portions 632 differ from those of the first upper terminal 630a in that the fusing portions 632 extend from both ends of the body portion 631. In addition, the second upper terminal 630b differs from the first upper terminal 630a in whether the power receiving portion 634 is included therein.

FIG. 26 is a view illustrating the third upper terminal of the motor according to the embodiment. When the third upper terminal 630c is described with reference to FIG. 26, since components of the third upper terminal 630c which are the same as those of the first upper terminal 630a are assigned to reference symbols which are the same as those of the components of the first upper terminal 630a, detailed descriptions thereof will be omitted.

The third upper terminal 630c may include a body portion 631, fusing portions 632, and through holes 633. In this case, the body portion 631 and the fusing portions 632 may be integrally formed.

The fusing portions 632 of the third upper terminal 630c may be formed to protrude upward from one side of the body portion 631. Specifically, the fusing portions 632 differ from those of the first upper terminal 630a in that the fusing portions 632 extend upward from both ends of the body portion 631. In addition, the third upper terminal 630c differs from the first upper terminal 630a in whether the power receiving portion 634 is included therein. In addition, the third upper terminal 630c differs from the second upper terminal 630b in that the third upper terminal 630c is longer than the second upper terminal 630b in the circumferential direction. That is, the third upper terminal 630c differs from the second upper terminal 630b in that a length of the third upper terminal 630c is greater than a length of the second upper terminal 630b.

The lower terminal 650 may be disposed under the bus bar body 610. In this case, the lower terminal 650 may be disposed inward from the outer circumferential surface 611c of the bus bar body 610 when viewed from above. That is, since the lower terminal 650 does not deviate from the outer circumferential surface of the bus bar body 610, horizontal space utilization of the motor 1 is improved.

One end of the first lower terminal 650a may be connected to the first upper terminal 630a through the first hole 612 and the other end thereof may be connected to the first upper terminal 630a through the second hole 613.

FIG. 27 is a view illustrating the first lower terminal of the motor according to the embodiment, FIG. 28 is an enlarged view illustrating a region C of FIG. 11, and FIG. 29 is an enlarged view illustrating a region D of FIG. 11.

Referring to FIG. 27, the first lower terminal 650a may include a body portion 651, through holes 653, a first end portion 654 and a second end portion 655.

The body portion 651 of the first lower terminal 650a may be disposed on the lower surface 611b of the bus bar body 610.

The through hole 653 of the first lower terminal 650a may be formed in the body portion 651.

The second protrusion 620 is disposed inside the through hole 653. In addition, as an end portion of the second protrusion 620 is fused, the first lower terminal 650a is fixed to the bus bar body 610.

The first end portion 654 which is one end of the body portion 651 may be in contact with the first upper terminal 630a through the first hole 612.

As illustrated in FIG. 28, the first end portion 654 may be in contact with a lower surface of the body portion 631 of the first upper terminal 630a through the first hole 612. In this case, the first end portion 654 may be formed by bending one end of the body portion 651. Referring to FIG. 27, the first end portion 654 may be formed by vertically bending one end of the body portion 651 and horizontally bending a part of the one end thereof.

In addition, a coupling force between the first end portion 654 and the body portion 631 of the first upper terminal 630a may be increased through a fusing process.

The second end portion 655 which is the other end of the body portion 651 may be in contact with the second upper terminal 630b through the second hole 613.

As illustrated in FIG. 29, the second end portion 655 may be in contact with the lower surface of the body portion 631 of the second upper terminal 630b through the second hole 613. In this case, the second end portion 655 may be formed by bending the other end of the body portion 651. Referring to FIG. 27, the second end portion 655 may be formed by vertically bending the other end of the body portion 651 and horizontally bending a part of the other end thereof.

In addition, a coupling force between the second end portion 655 and the body portion 631 of the second upper terminal 630b may be increased through a fusing process.

FIG. 30 is a view illustrating the second lower terminal of the motor according to the embodiment.

The second lower terminal 650b may include a body portion 651, fusing portions 652, and through holes 653. In this case, the body portion 651 and the fusing portions 652 of the second lower terminal 650b may be integrally formed.

The body portion 651 may be formed to have a plate shape. In addition, the body portion 651 may be in contact with and supported by the lower surface 611b of the body 611.

The fusing portion 652 may be in contact with and electrically connected to the end portion of the coil 330. In addition, a coupling force between the fusing portion 652 and the coil 330 may be increased through a fusing process.

The fusing portion 652 may be formed to protrude upward from one side of the body portion 651. Specifically, the fusing portion 652 may extend upward from an outer side surface of the body portion 651. In this case, the fusing portion 652 may be formed to have a plate shape.

As illustrated in FIG. 13, the fusing portion 652 is disposed inward from the outer circumferential surface 611c of the bus bar body 610.

The fusing portion 652 may pass through the fourth hole 615. Accordingly, the fusing portion 652 may protrude higher than the upper surface 611a of the bus bar body 610.

Referring to FIG. 17, a protruding height H1 of the fusing portion 652 of the second lower terminal 650b may be greater than a protruding height H2 of the fusing portion 632 of the upper terminal 630.

The second protrusion 620 is disposed inside the through hole 653. In addition, as an end portion of the second protrusion 620 is fused, the second lower terminal 650b is fixed to the bus bar body 610.

FIG. 31 is a view illustrating a delta connection of the motor according to the embodiment, and FIG. 32 is a view illustrating arrangement relationships between the end portions of the coils and the bus bar disposed in the motor according to the embodiment.

As illustrated in FIG. 31, the delta connection may be realized in the motor 1 using the bus bar 600.

As illustrated in FIG. 32, the end portions of the coils 330 are disposed to be electrically connected to the fusing portions 632 of the upper terminals 630 and the fusing portions 652 of the second lower terminals 650b. In addition, a U-phase, a W-phase, and a V-phase may be realized due to electric power supplied through the first upper terminals 630a.

Meanwhile, the upper terminal 630 and the lower terminal 650 may be formed of a metal material having electrical conductivity.

In addition, referring to FIG. 15, the fusing portions 632 of the upper terminals 630 and the fusing portions 652 of the second lower terminals 650b may be disposed on the same virtual circumference about the center C.

The bearings 700 are disposed on the outer circumferential surface of the shaft 500 so that the shaft 500 is rotatably supported by the bearings 700.

The bearings 700 of the motor 1 may be divided into the upper bearing 710 and the lower bearing 720 according to the arrangement position.

As illustrated in FIG. 2, the upper bearing 710 may be disposed between the second flange 130 of the housing 100 and the shaft 500. In addition, the lower bearing 720 may be disposed between the first flange 120 of the housing 100 and the shaft 500.

An end portion of an upper side of the washer 800 may support the lower bearing 720. For example, an end portion of the washer 800 may be in contact with the lower surface of the lower bearing 720 to support the lower bearing 720. In this case, the washer 800 may be coupled to the first flange 120 of the housing 100. Accordingly, the lower bearing 720 is prevented from being separated from the shaft 500 by the washer 800.

FIG. 33 is a cross-sectional view illustrating the washer of the motor according to the embodiment.

Referring to FIG. 33, the washer 800 may include a washer main body 810 and a flange portion 820.

The washer main body 810 may be formed to have a pipe shape. An upper surface 811 of the washer main body 810 may support one side of a lower portion of the lower bearing 720. Specifically, the upper surface 811 may support a lower surface of the outer wheel disposed on the lower bearing 720.

The flange portion 820 may protrude from an outer circumferential surface of a lower side of the washer main body 810 in the radial direction.

Accordingly, an upper surface 821 of the flange portion 820 may be in contact with the first step surface 126. Accordingly, the washer 800 may be inserted into the housing 100 to a depth preset by the first step surface 126.

In this case, an outer circumferential surface 822 of the flange portion 820 may be in contact with the first-first inner sidewall portion 124.

While the present invention has been shown and described with reference to the exemplary embodiments thereof, it will be understood by those skilled in the art that various changes in form and details may be made therein without departing from the spirit and scope of the invention as defined by the appended claims. In addition, it should be understood that differences related to modifications and changes fall within the scope of the present invention defined by the appended claims.

REFERENCE NUMERALS

1: MOTOR
100: HOUSING
200: COVER
300: STATOR
400: ROTOR
500: SHAFT
600: BUS BAR
610: BUS BAR BODY
630: UPPER TERMINAL
630a: FIRST UPPER TERMINAL
630b: SECOND UPPER TERMINAL
630c: THIRD UPPER TERMINAL
650: LOWER TERMINAL
650a: FIRST LOWER TERMINAL
650b: SECOND LOWER TERMINAL
700: BEARING
800: WASHER

The invention claimed is:
1. A bus bar comprising:
a main body;
upper terminals disposed on an upper surface of the main body; and
lower terminals disposed on a lower surface of the main body,
wherein the upper terminals include first upper terminals and a second upper terminal,
the lower terminals include a first lower terminal,
the main body includes a first hole and a second hole which pass through the main body, and one end of the first lower terminal is connected to the first upper terminal through the first hole and the other end thereof is connected to the second upper terminal through the second hole.

2. The bus bar of claim 1, wherein the first hole is disposed inward from the second hole.

3. The bus bar of claim 1, wherein each of the first upper terminals and the second upper terminal includes:
a body portion in contact with one surface of the main body; and
a fusing portion extending upward from the body portion,
wherein the first upper terminal further includes a power receiving portion extending upward from the body portion.

4. The bus bar of claim 3, wherein:
the main body further includes a first protrusion protruding from the upper surface of the main body;
the body portion includes a through hole; and
the first protrusion is disposed inside the through hole.

5. The bus bar of claim 3, wherein:
the main body further includes a first protruding portion protruding from the upper surface of the main body; and
the first protruding portion is disposed between the upper terminals disposed adjacent to each other.

6. The bus bar of claim 5, wherein a height of the first protruding portion is greater than a height of the body portion.

7. The bus bar of claim 1, wherein the upper terminals further include a third upper terminal,
wherein the third upper terminal includes:
a body portion disposed on the upper surface of the main body; and
a fusing portion extending upward from the body portion.

8. The bus bar of claim 7, wherein the lower terminals further include a second lower terminal, wherein:
the second lower terminal includes a body portion disposed on the lower surface of the main body, and
a fusing portion extending upward from the body portion; and
the fusing portion of the second lower terminal passes through the main body.

9. The bus bar of claim 8, wherein a protruding height (H1) of the fusing portion of the second lower terminal is greater than a protruding height (H2) of the fusing portion of the upper terminal.

10. The bus bar of claim 7, wherein:
the second upper terminal and the third upper terminal are disposed between the first upper terminals; and
the third upper terminal is disposed inside the second upper terminal.

11. The bus bar of claim 8, wherein the fusing portion of the upper terminal and the fusing portion of the second lower terminal of the lower terminals are disposed inward from an outer circumferential surface of the main body.

12. The bus bar of claim 1, wherein the first lower terminal includes:
a body portion disposed on the lower surface of the main body;
a through hole formed in the body portion;
a first end portion connected to the first upper terminal through the first hole; and
a second end portion connected to the second upper terminal through the second hole,
wherein a second protrusion protruding from the lower surface of the main body is disposed inside the through hole of the first lower terminal.

13. A motor comprising:
a shaft;
a rotor through which the shaft passes;
a stator disposed outside the rotor; and
a bus bar disposed on the stator,
wherein the bus bar includes a main body, upper terminals disposed on an upper surface of the main body, and lower terminals disposed on a lower surface of the main body,
the upper terminals include a first upper terminal, a second upper terminal, and a third upper terminal,
the lower terminals include a first lower terminal and a second lower terminal,
the main body includes a first hole and a second hole which pass through the main body, and
one end of the first lower terminal is connected to the first upper terminal through the first hole and the other end thereof is connected to the second upper terminal through the second hole.

14. The motor of claim 13, wherein:
the stator includes a stator core, a plurality of insulators disposed on teeth of the stator core, and a coil connected to a fusing portion of the upper terminal; and
a second protruding portion extending downward from the lower surface of the main body is disposed between the insulators.

15. The motor of claim 14, wherein a third protruding portion extending downward from the lower surface of the main body is in contact with an upper surface of the stator core.

16. The motor of claim 14, wherein:
the main body further includes a third hole formed to be recessed in an outer circumferential surface of the main body; and
an end portion of the coil passes through the third hole.

* * * * *